(12) United States Patent
Oberman et al.

(10) Patent No.: US 7,042,891 B2
(45) Date of Patent: May 9, 2006

(54) DYNAMIC SELECTION OF LOWEST LATENCY PATH IN A NETWORK SWITCH

(75) Inventors: Stuart F. Oberman, Sunnyvale, CA (US); Anil Mehta, Milpitas, CA (US); Rodney N. Mullendore, San Jose, CA (US); Kamran Malik, San Jose, CA (US)

(73) Assignee: Nishan Systems, Inc., Broomfield, CO (US)

(*) Notice: Subject to any disclaimer, the term of this patent is extended or adjusted under 35 U.S.C. 154(b) by 856 days.

(21) Appl. No.: 09/755,670

(22) Filed: Jan. 4, 2001

(65) Prior Publication Data

US 2002/0118640 A1    Aug. 29, 2002

(51) Int. Cl.
*H04L 12/56* (2006.01)
*H04L 12/26* (2006.01)

(52) U.S. Cl. .................. 370/412; 370/428; 370/230
(58) Field of Classification Search ........ 370/230–235, 370/411–429, 401, 466, 395.7, 395.21, 395.22; 710/52, 53, 56

See application file for complete search history.

(56) References Cited

U.S. PATENT DOCUMENTS

| | | | |
|---|---|---|---|
| 4,821,034 A | | 4/1989 | Anderson et al. |
| 5,490,007 A | | 2/1996 | Bennett et al. |
| 5,546,391 A | * | 8/1996 | Hochschild et al. ........ 370/413 |
| 5,619,497 A | | 4/1997 | Gallagher et al. |
| 5,764,895 A | * | 6/1998 | Chung ........................ 370/428 |
| 5,790,545 A | * | 8/1998 | Holt et al. ................. 370/413 |
| 5,828,475 A | * | 10/1998 | Bennett et al. .............. 710/52 |
| 5,831,985 A | | 11/1998 | Sandorfi |
| 5,832,222 A | * | 11/1998 | Dziadosz et al. ........... 709/216 |
| 5,838,677 A | * | 11/1998 | Kozaki et al. .............. 370/428 |
| 5,841,997 A | | 11/1998 | Bleiweiss et al. |
| 5,991,295 A | * | 11/1999 | Tout et al. ................ 370/395.7 |
| 6,005,849 A | | 12/1999 | Roach et al. |
| 6,061,360 A | | 5/2000 | Miller et al. |
| 6,091,707 A | * | 7/2000 | Egbert et al. ............... 370/428 |
| 6,094,434 A | * | 7/2000 | Kotzur et al. ............... 370/429 |
| 6,134,617 A | | 10/2000 | Weber |
| 6,144,668 A | * | 11/2000 | Bass et al. .................. 370/401 |
| 6,185,203 B1 | | 2/2001 | Berman |
| 6,185,620 B1 | | 2/2001 | Weber et al. |

(Continued)

OTHER PUBLICATIONS

"Adaptec Announces EtherStorage Tachnology," Adaptec, May 4, 2000, 2 pages.

*Primary Examiner*—Steven Nguyen
(74) *Attorney, Agent, or Firm*—Hensley Kim & Edgington, LLC

(57) ABSTRACT

A system and method for low latency switching of data packets in a network switch. A network switch may include multiple input ports, multiple output ports, and a shared random access memory coupled to the input ports and output ports by data transport logic. Under normal operation, the data transport logic stores packet data into the memory. Later, the packet data is read from the memory and output to a destination output port. To reduce latency when the switch is not congested, the switching logic may be configured to perform a cut-through operation by routing packets directly from input ports to output ports without storing any portion of the packet in the memory. Alternatively, the switch may begin forwarding the stored packet data to the output port before the entire packet has been received or stored in the memory.

58 Claims, 16 Drawing Sheets

U.S. PATENT DOCUMENTS

| | | |
|---|---|---|
| 6,195,703 B1 | 2/2001 | Blumenau et al. |
| 6,400,715 B1 * | 6/2002 | Beaudoin et al. ........... 370/392 |
| 6,400,730 B1 * | 6/2002 | Latif et al. ................... 370/466 |
| 6,421,769 B1 * | 7/2002 | Teitenberg et al. ......... 711/170 |
| 6,542,502 B1 * | 4/2003 | Herring et al. ............. 370/428 |
| 6,606,326 B1 * | 8/2003 | Herring ...................... 370/412 |
| 6,611,519 B1 * | 8/2003 | Howe ......................... 370/428 |
| 6,751,225 B1 * | 6/2004 | Chung ........................ 370/401 |

* cited by examiner

| Field Name | Size (in bits) | Description |
| --- | --- | --- |
| Queue Count 490A | 5 | This field is the number of output queues that contain this packet. When a packet is received, this field is initially set to the number of output queues on which the packet is inserted. This value is the number of 1 bits (i.e., asserted bits) in the port mask of the flow descriptor (after the source port has been removed from the mask). This field will be decremented as each output queue transmits the packet until the count reaches 0 when the packet (descriptor and cell memory) will be freed. This field may be stored in a separate queue count memory. |
| Cluster Count 490B | 7 | This field stores the number of clusters used by the packet. This is used by the read stored packet Manager to indicate how many clusters are to be freed when a packet is either read out or discarded. |
| Input Flow Number 490C | 10 | This field is used to track resources per flow and to update resources when the packet is freed. |
| Threshold Group / Virtual Channel Number 490D | 5 | This field is used to track resources per threshold group and to update resources when the packet is freed. The MSB (most significant bit) of this field indicates if the lower bits are group or VC (virtual channel) number: 1 = threshold group (4 bits)   0 = VC number (3 bits) |
| Cell List Head 490E | 15 | This field points to the first cell (cluster) of the packet's data. Note a linked list of cells (clusters) holds the packet data. |
| Cell List Tail 490F | 15 | This field points to the last cell (cluster) of the packet's data. Note a linked list of cells (clusters) holds the packet data. |
| Tail Valid 490G | 1 | This field indicates whether the packet has completely been written to memory as of the time that the packet descriptor is written, and thus whether the tail cell pointer is valid. This is used by the read stored packet manager in the case of an early-forwarded packet. |
| Error Detected 490H | 1 | This field indicates whether any error has been detected by the fabric before writing to memory. This bit is the ERR (error) bit of the packet. It is written at the end of a packet, when the Cell List Tail and Tail Valid signals are updated. For multiple cell packets, this bit is cleared on the first write of the packet descriptor. |
| To Be Dropped 490I | 1 | This bit indicates that the packet is to be dropped when it is scheduled. This occurs for packets when resources are depleted after it has already begun to be written to memory. In some embodiments it may be guaranteed that this packet is never early-forwarded, and thus can be dropped when it is started to be read. |
| Source Port 490J | 5 | This field contains the port from which the packet was received. This value is used when a packet is freed to adjust the resource allocation fields in the appropriate input port descriptor. |
| High Priority 490K | 1 | This field indicates if the packet is high priority. If this bit is set, the packet is not subject to thresholding. The packet is only dropped if there are no more "non-VC" (non-virtual channel) resources available. |

Fig. 2

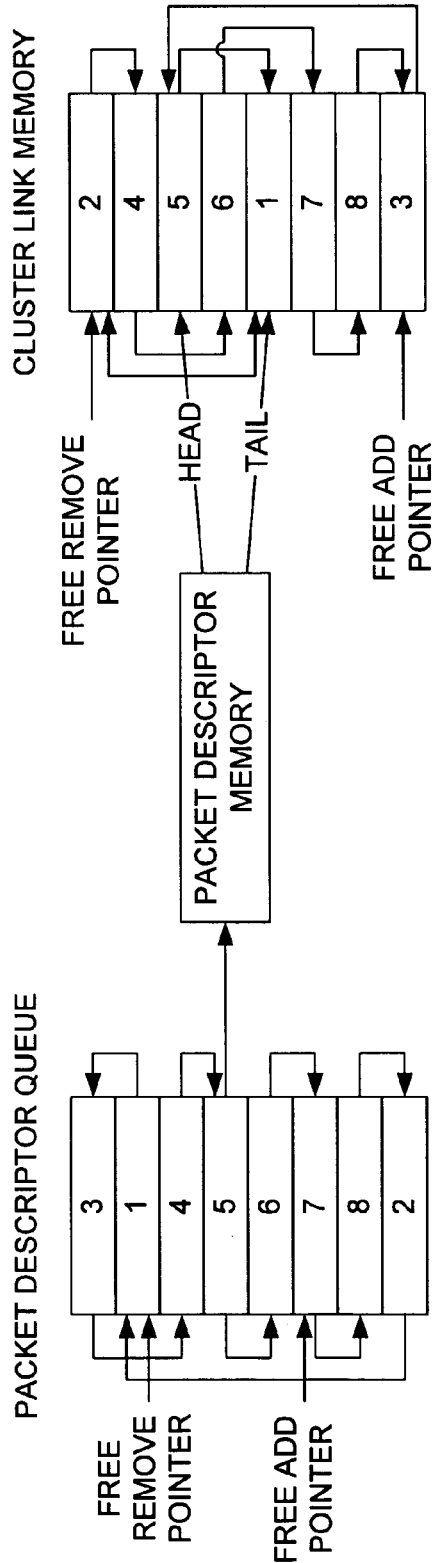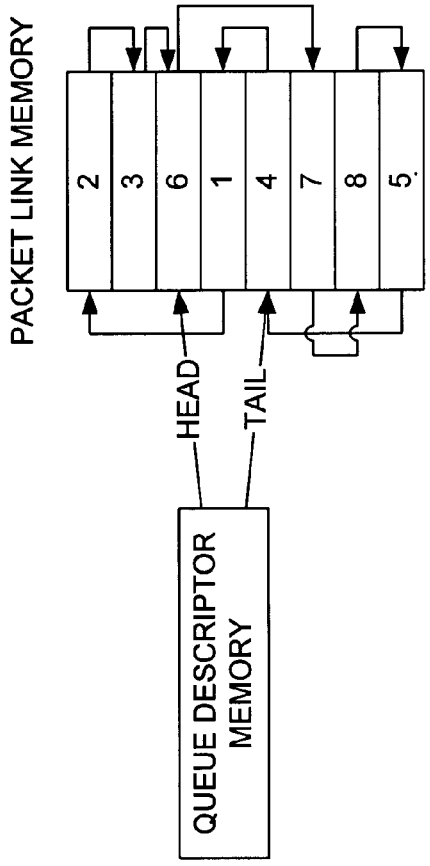
Fig. 3
Fig. 4

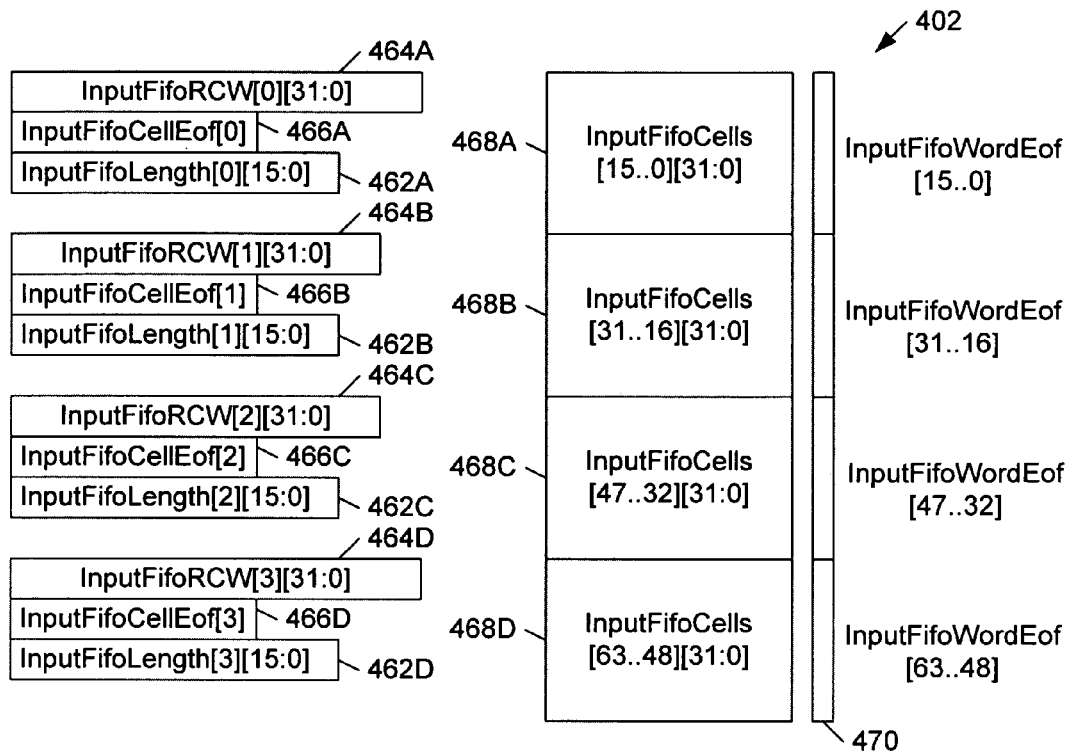

Fig. 5

| | FIFO Pointer | Function |
|---|---|---|
| 472A | HeadCellPtr[1:0] | Points to the current head cell |
| 472B | TailCellPtr[1:0] | Points to the current tail cell |
| 474 | SavedFirstCellPtr[1:0] | Points to the saved first cell for the currently read packet |
| 476 | WriteWordPtr[3:0] | Points to the word within the tail cell that is being written to |
| 478 | SfReadWordPtr[3:0] | Points to the word within the head cell that is being read from for store and forward |
| 480 | CtReadWordPtr[3:0] | Points to the word within the head cell that is being read from for cut-through |

Fig. 6

OSI MODEL

| LAYER | LAYER NAME | FUNCTION |
|---|---|---|
| 7 | APPLICATION LAYER | PROGRAM-TO-PROGRAM COMMUNICATION. |
| 6 | PRESENTATION LAYER | MANAGES DATA REPRESENTATION CONVERSIONS. FOR EXAMPLE, THE PRESENTATION LAYER WOULD BE RESPONSIBLE FOR CONVERTING FROM EBCDIC TO ASCII. |
| 5 | SESSION LAYER | RESPONSIBLE FOR ESTABLISHING AND MAINTAINING COMMUNICATIONS CHANNELS. IN PRACTICE, THIS LAYER IS OFTEN COMBINED WITH THE TRANSPORT LAYER |
| 4 | TRANSPORT LAYER | RESPONSIBLE FOR END-TO-END INTEGRITY OF DATA TRANSMISSION. |
| 3 | NETWORK LAYER | ROUTES DATA FROM ONE NODE TO ANOTHER. |
| 2 | DATA LINK LAYER | RESPONSIBLE FOR PHYSICAL PASSING DATA FROM ONE NODE TO ANOTHER. |
| 1 | PHYSICAL LAYER | MANAGES PUTTING DATA ONTO THE NETWORK MEDIA AND TAKING THE DATA OFF. |

Fig. 17

DYNAMIC SELECTION OF LOWEST LATENCY PATH IN A NETWORK SWITCH

BACKGROUND OF THE INVENTION

1. Field of the Invention

The present invention generally relates to the field of network switches. More particularly, the present invention relates to a dynamic system and method for routing data packets through a network switch.

2. Description of the Related Art

In enterprise computing environments, it is desirable and beneficial to have multiple servers able to directly access multiple storage devices to support high-bandwidth data transfers, system expansion, modularity, configuration flexibility, and optimization of resources. In conventional computing environments, such access is typically provided via file system level Local Area Network (LAN) connections, which operate at a fraction of the speed of direct storage connections. As such, access to storage systems is highly susceptible to bottlenecks.

Storage Area Networks (SANs) have been proposed as one method of solving this storage access bottleneck problem. By applying the networking paradigm to storage devices, SANs enable increased connectivity and bandwidth, sharing of resources, and configuration flexibility. The current SAN paradigm assumes that the entire network is constructed using Fibre Channel switches. Therefore, most solutions involving SANs require implementation of separate networks: one to support the normal LAN and another to support the SAN. The installation of new equipment and technology, such as new equipment at the storage device level (Fibre Channel interfaces), the host/server level (Fibre Channel adapter cards) and the transport level (Fibre Channel hubs, switches and routers), into a mission-critical enterprise computing environment could be described as less than desirable for data center managers, as it involves replication of network infrastructure, new technologies (i.e., Fibre Channel), and new training for personnel. Most companies have already invested significant amounts of money constructing and maintaining their network (e.g., based on Ethernet and/or ATM). Construction of a second high-speed network based on a different technology is a significant impediment to the proliferation of SANs. Therefore, a need exists for a method and apparatus that can alleviate problems with access to storage devices by multiple hosts, while retaining current equipment and network infrastructures, and minimizing the need for additional training for data center personnel.

In general, a majority of storage devices currently use "parallel" SCSI (Small Computer System Interface) or Fibre Channel data transfer protocols whereas most LANs use an Ethernet protocol, such as Gigabit Ethernet. SCSI, Fibre Channel and Ethernet are protocols for data transfer, each of which uses a different individual format for data transfer. For example, SCSI commands were designed to be implemented over a parallel bus architecture and therefore are not packetized. Fibre Channel, like Ethernet, uses a serial interface with data transferred in packets. However, the physical interface and packet formats between Fibre Channel and Ethernet are not compatible. Gigabit Ethernet was designed to be compatible with existing Ethernet infrastructures and is therefore based on an Ethernet packet architecture. Because of these differences there is a need for a new system and method to allow efficient communication between the three protocols.

One such system and method is described in the U.S. patent application titles "METHOD AND APPARATUS FOR TRANSFERRING DATA BETWEEN IP NETWORK DEVICES AND SCSI AND FIBRE CHANNEL DEVICES OVER AN IP NETWORK" by Latif, et al., filed on Feb. 8, 2000 (Ser. No. 09/500,119). This application is hereby incorporated by reference in its entirety. This application describes a network switch that implements a protocol referred to herein as Storage over Internet Protocol (SoIP).

Many switches are characterized based on their minimum routing times. These times effectively measure best case scenario performance that occurs when the destination output port is available. A port is said to be available when it has resources to devote to the incoming packet. For example, an output port may have an output FIFO (first-in first-out) memory for storing packets until they have been transmitted out of the switch. However, the best case scenario of having output port resources available occurs relatively infrequently in real-world environments because the output FIFOs are often full or partially filled with prior packets. Thus, it would be advantageous for a network switch, particularly within the context of supporting SoIP, to be able to efficiently route packets both when the output port is available and when the output port is unavailable due to other packet traffic.

SUMMARY

The problems set forth above may at least in part be solved by a system and method that is capable of dynamically selecting a lowest latency path within a network switch. The lowest latency path may be selected from one or more different paths that are available. In one embodiment, the switch may be configured to select from two different types of routing schemes: cut-through routing, and early forwarding. Cut-through routing entails routing packets from an input port to one or more output ports without storing them in an intermediate random access memory (also referred to herein as a shared memory). This may be accomplished by determining that one or more of the destination output ports for the packet have resources available to store the packet. Cut-through routing is useful because the packet is received as a stream of data (i.e., not in parallel), and by refraining from storing the packet into a shared memory, the latency of switching the packet is reduced. Conversely, early forwarding involves storing the packet in random access memory (RAM) and then forwarding the packet to one or more corresponding output ports. In order to reduce latency, the transfer of the packet from the RAM to the output port may be initiated before the entire packet arrived in the RAM. Thus, early forwarding utilizes the RAM to perform a function somewhat similar to that of a FIFO memory. Store and forward routing is an extreme case of early forwarding in which the entire packet is stored in the RAM for some time before the packet is forwarded to the output port. In terms of latency, cut-through has the shortest delay, followed by early forwarding, and then store and forward routing.

In one embodiment, the method for selecting the lowest latency path may include receiving (at the switch's input port) data forming a packet that is to be routed to one or more different output ports. As the first bytes of the packet are received, the packet may be examined (e.g., the packet's header may be examined) to determine to which or the switch's output ports the packet is to be routed. The input port may then determine whether one or more of the corresponding output ports have resources available to handle the packet. One measure of availability may be whether the output port's output FIFO has sufficient storage available to handle the packet. This determination may be performed in a number of different ways. For example, the number of bytes available in the output FIFO may be compared with a predetermined cut-through threshold value that may be calculated based on a number of factors, including the maximum packet size and the relative speed of the input and output ports.

If the output port has enough resources, the data is cut-through by directly forwarding the bytes received at the input port to the output port (e.g., from the input port's input FIFO to the output port's output FIFO). If, however, the output port does not have enough resources available to handle the packet, then the data is stored to a random access memory. Once the output port is determined to have resources available to handle the packet, the process of reading the packet from the RAM may be started. Bytes belonging to the packet may continue to be received at the input port and written to the RAM during this process. As previously noted, if the entire packet has not been stored to the RAM before the transfer from the RAM to the output port is started, then the packet is said to be early forwarded. If the entire packet has been stored to the RAM before the transfer from the RAM output port has been started, then the packet is said to be routed by store-and-forward routing.

In some embodiments, the switch may be configured to generate a packet descriptor for each packet received. The packet descriptor may include various information about the packet, including, for example, length information about the packet, an indication as to whether the packet is a storage packet or an Internet Protocol (IP) packet, a packet priority indicator, an indication as to whether the storage packet is SCSI or Fibre Channel, and an indication as to which output port corresponds thereto.

In some embodiments, the switch may be configured to detect that either the random access memory or an input FIFO associated with a particular input port is approaching a maximum capacity. In response, the switch may be configured to preferentially discard lower priority packets or IP packets rather than storage packets.

In one embodiment, a network switch configured to select the lowest latency routing from a number of different possible routings may comprise a number of input ports, a number of output ports, a memory, and data transport logic coupled between the input ports, the output ports, and the memory. The input ports may be configured to receive data forming a packet, wherein the packet may have a destination that corresponds to one or more of the output ports. As noted above, the shared memory may be a random access memory (e.g., an SRAM, SDRAM, or RDRAM). The switch may include control logic (e.g., output port control logic) configured to determine whether the output port has sufficient resources available to handle the packet. In one embodiment, the output port may have a number of registers (called availability registers) configured to store values that each correspond to a particular input port. The control logic may compare these values with the level of available resources in the output port to determine whether sufficient resources are available to handle the packet. The values stored in the registers may be calculated according to a number of factors, including the maximum packet size. The presence of other packets (e.g., from the same input port and/or higher priority packets from other input ports) that are waiting to be routed to the output port may also be taken into account in determining whether the output port should be deemed to have sufficient resources available for the packet. If the output port is determined to have sufficient resources available, then the data transport logic may be configured to perform a cut-through operation by routing the data from the input port to the output port (without first storing the data into the RAM).

Conversely, in response to detecting that the output port does not have resources available for the packet, the data transport logic may be configured to store the data to the RAM. In response to detecting that the output port has the resources available to handle the packet (i.e., after at least a portion of the data has already been stored in the RAM), the data transport logic may be configured to begin transferring the packet's data from the RAM to the corresponding output port (or ports). This may occur concurrently with the remainder of the packet being received at the input port and stored to the RAM.

To prevent potential conflicts, in some embodiments the switch may be configured to prevent a second packet received at the same input port as the first packet from being cut-through if the first packet has not already been transferred to the output port's output FIFO. Advantageously, this may prevent packets from being switched out-of-order. For example, assuming that a first packet was stored to memory for store-and-forward routing because the packet's corresponding output port was unavailable (e.g., the output port's output FIFO was full). In some implementations, if the output port became available after the first packet was stored in the memory, and if a second packet having the same corresponding output port was received, the second packet could conceivably be cut-through to the output port before the first packet's store-and-forward is completed. Thus, by preventing a second packet received after a first packet from being cut-through unless the first packet has already been output, the proper packet order may be maintained. For example, one potential out of order conflict may arise in the small window of time between when the output port learns about the first packet and when the second packet requests cut-through. In some embodiments, conflicts may occur because the act of storing to the RAM may be decoupled from the act of alerting the output port that a packet is coming. The switch may also be configurable to refrain from performing either cut-through routing and/or early forwarding in total, on a port-by-port basis, or on a packet-by-packet basis.

In multi-chip embodiments, a command bus (e.g., shared or point to point) may be used to communicate across the multiple chips. Each chip may support a number of ports (e.g., four), and each input port may use the command bus to alert any or all of the output ports of a packet's existence. For example this may be accomplished by placing the output packet's number or identifier on one of each destination output ports' output queues. Each output port may have multiple output queues (e.g., 256 queues per output port) to allow different priority schemes to be implemented (e.g., a different priority may be assigned to each queue). After the packet identifier has been placed on the queue or queues, each port may have a scheduling unit that prioritizes and schedules packets having identifiers stored in the output queues. Details of one such scheduling unit are described in U.S. patent application Ser. No. 09/685,985, titled "System And Method For Scheduling Service For Multiple Queues," by Oberman, et al., filed on Oct. 10, 2000, which is incorporated herein by reference in its entirety. Generally, the scheduling unit picks a packet identifier or number from one of the output queues, reads the corresponding packet from the RAM, and initiates the transfer of the packet from the RAM to the port's output FIFO. Note that the packet may be read out of memory multiple times (e.g., once for each corresponding destination port if necessary). Also note that the output queues may be formed using a queue link memory (to store the packet identifiers) and a queue descriptor memory (configured to store pointers that form the output queues from the queue link memory).

As noted above, in some embodiments, improper ordering may occur between the time that a packet identifier arrives on an output queue and the time that the output port actually detects that the packet identifier has arrived. For example, a subsequent packet from the same input port may request cut-through routing to the output port during this interim time period, which could result in the output port granting the cut-through request and switching the cut-through packet out-of-order (i.e., before the earlier non-cut-through packet). To prevent this, the input port may be configured to wait a predetermined number of clock cycles before requesting cut-through for another packet destined for the same output port. In another embodiment, the input port may be configured to send a unique sequence number to the output port (or to each queue within the output port for multiple queue embodiments) as part of the cut-through request process. The output port may be configured to track sequence numbers for each queue/input port combination and then deny cut-through unless the sequence number for the last packet of the corresponding output queue received by the output port either from RAM or from cut-through routing into the output FIFO is one less than the sequence number for the packet requesting cut-through.

However, in embodiments that have a large number of queues per output port and/or a large number of output ports, this may result in an overly large number of sequences that must be tracked and stored. One alternative is to store only one sequence port (regardless of the number of queues per port) and then to make sure that all the queues are empty before allow a cut-through routing to take place. In this embodiment, the input port tracks a single sequence for each output port, and the output port tracks if any packets are entered on any of its output queues. Thus, the conditions for allowing cut-through are: (1) that all output queues of the destination output port be empty, and (2) that there are no packets in stored in shared memory for the output port. The second condition may be determined by the input port comparing the current sequence number for the packet that is requesting cut-through routing with the stored sequence number for the destination port. If the current sequence number immediately follows the stored sequence number, then the second condition is satisfied. This ensures that there are no prior packets in shared memory that have not yet been added to one of the output port's queues.

In some embodiments, the switch may be configured to disable cut-through operations for one or more output ports (i.e., on a port-by-port basis). This capability may be particularly advantageous to network administrators when trying to perform network troubleshooting. The switch may also be configured to disable cut-through operations (i) on a packet-by packet basis, (ii) to a particular output port if any data corresponding to packets to be routed to the output port is stored in the memory, and/or (iii) from a particular type of input port to a particular type of output port.

In one embodiment, the switch's data transport logic may include a cross-bar switch configurable to route data from each input port to each output port. The switch may also comprise one or more network processors configured to add an Ethernet prefix to received Fibre Channel packets in response to detecting that the Fibre Channel packets are being routed to an Ethernet output port. While different configurations are possible and contemplated, in one embodiment the input and output ports are either Fibre Channel or Gigabit Ethernet ports.

BRIEF DESCRIPTION OF THE DRAWINGS

The foregoing, as well as other objects, features, and advantages of this invention may be more completely understood by reference to the following detailed description when read together with the accompanying drawings in which:

FIG. 2 illustrates details of one embodiment of a packet descriptor;

FIG. 3 illustrates details of one embodiment of the cluster link memory, packet free queue, and packet descriptor memory from FIG. 1;

FIG. 4 illustrates details of one embodiment of the queue descriptor memory and queue link memory from FIG. 1;

FIG. 5 is a diagram illustrating one embodiment of the structure of the input FIFO from FIG. 1;

FIG. 6 illustrates one embodiment of a set of pointers that maybe used in connection with the input FIFO of FIG. 1;

FIG. 17 illustrates one embodiment of the OSI (Open System Interconnection) model.

Figure 1:
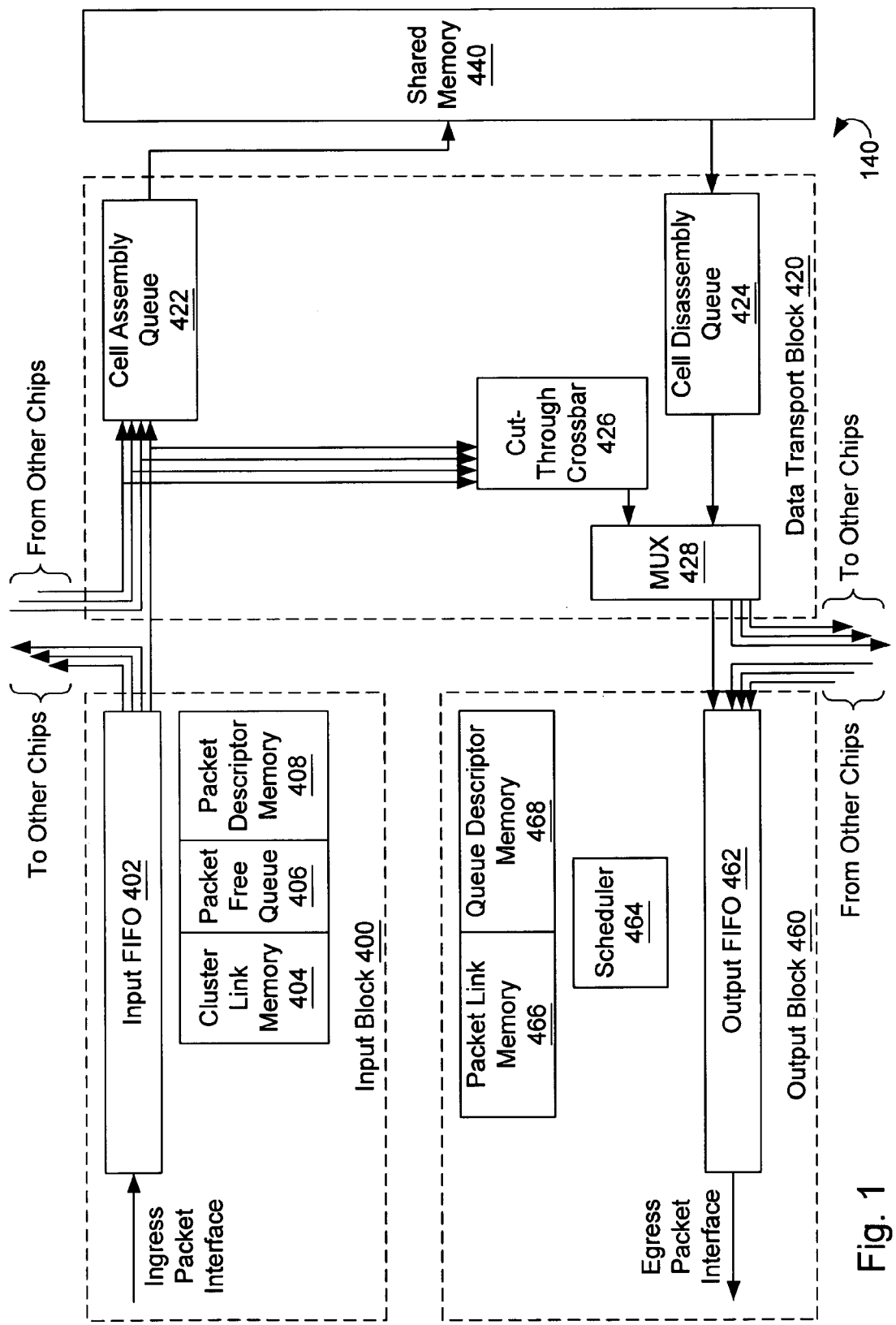
FIG. 1 is a block diagram of a portion of one embodiment of a network switch fabric.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Turning now to FIG. 1, a block diagram of a portion of one embodiment of a network switch fabric is shown. In this embodiment, switch fabric portion 140 comprises an input block 400, a data transport block 420, a shared memory 440, and an output block 460. The switch fabric may comprise a plurality of switch fabric portions 140 (e.g., 4 or 8 portions, each having one input port and one output port). In one embodiment, input block 400, data transport block 420 and output block 460 are all implemented on a single chip (e.g., an application specific integrated circuit or ASIC). The switch fabric may include one or more input blocks 400, wherein each input block 400 is configured to receive internal format packet data (also referred to as frames), from which it is then written into an input FIFO 402. Input block 400 may be configured to generate packet descriptors for the packet data and allocate storage within shared memory (i.e., RAM) 440. As will be described in greater detail below, the switch fabric may route the packet data in a number of different ways, including a store-and-forward technique, an early forwarding technique, and a cut-through routing technique.

Input block 400 may further comprise a cluster link memory 404, a packet free queue 406, and a packet descriptor memory 408. Cluster link memory 404 may be configured as a linked list memory to store incoming packets. Packet free queue 406 is configured to operate as a "free list" to specify which memory locations are available for storing newly received packets. In some embodiments, input block 400 may be configured to allocate storage within shared memory 440 using clusters. In this embodiment, a cell is the minimum number of bytes that can be read from or written to shared memory 440 (e.g., 512 bits or 64 bytes). The cell size is a function of the interface with shared memory 440. However, in some embodiments, a number of cells (e.g., two cells) may be defined as a "cluster". Clusters are used to reduce the number of bits required for tracking and managing packets. Advantageously, by dividing packets into clusters instead of cells, the overhead for each packet may potentially be reduced. For example, in one embodiment shared memory 440 may allocate memory in 128-byte clusters. The cluster size may be selected based on a number of factors, including the size of shared memory 440, the average and maximum packet size, and the size of packet descriptor memory 408. However, the potential disadvantage is that a small packet that would normally fit within a single cell will nevertheless be assigned an entire cluster (i.e., effectively wasting a cell). While this is a design choice, if the number of small packets is low relative to the number of large packets, the savings may outweigh the disadvantages. In some embodiments clusters may not be used.

Upon receiving packet data corresponding to a new packet, input block 400 may be configured to allocate clusters in shared memory 440 (using cluster link memory 404) and a packet descriptor to the new packet. Packet descriptors are entries in packet descriptor memory 408 that contain information about the packet. One example of information contained within a packet descriptor may include pointers to which clusters in shared memory 440 store data corresponding to the packet. Other examples may include format information about the packet (e.g., the packet length, if known), and the destination ports for the packet.

In the embodiment of switch fabric 140 shown in FIG. 1, data transport block 420 includes cell assembly queues 422, cell disassembly queues 424, cut-through crossbar switch 426, and multiplexer 428. Cell assembly queues 422 are configured to receive packets from input block 400 and store them in shared memory 440. In one embodiment, cell assembly queues 422 may operate as FIFO memories combined with a memory controller to control the storage of the packets into shared memory 440. Cut-through crossbar 426 is configured to connect selected inputs and outputs together in cooperation with multiplexer 428. Advantageously, this may allow cut-through routing of packets, as explained in greater detail below.

In some embodiments, switch fabric 140 may be implemented using multiple chips that operate in parallel. In these configurations, cell assembly queue 422 and cell disassembly queue 424 may operate as serial-to-parallel and parallel-to-serial converters, respectively. For example, in an implementation having four switch fabric chips, as a particular 4-byte word is received, input FIFO 402 may be configured to distribute the 4-byte word amongst the four chips (i.e., one byte per chip) with one byte going to each chip's data transport block 420. Once 16 bytes have been received in each chip's cell assembly queue 422, the 64-byte cell may be stored to shared memory 440. Similarly, assuming a 128-bit data interface between shared memory 440 and the four switch fabric chips 140, a 64-byte cell may be read from shared memory 440 in four 16-byte pieces (i.e., one piece per chip), and then converted back into a single serial stream of bytes that may be output one byte per clock cycle by output FIFO 462.

Shared memory 440 may have write ports that are coupled to cell assembly queues 422, and read ports coupled to cell disassembly queues 424. In one embodiment, switch fabric 140 may support multiple ports for input and output, and switch fabric 140 may also be configured to perform bit-slice-like storage across different banks of shared memory 440. In one embodiment, each switch fabric 140 may be configured to access only a portion of shared memory 440. For example, each switch fabric may be configured to access only 2 megabytes of shared memory 440, which may have a total size of 8 megabytes for a 16-port switch. In some embodiments, multiple switch fabrics may be used in combination to implement switches supporting larger numbers of ports. For example, in one embodiment each switch fabric chip may support four full duplex ports. Thus, two switch fabric chips may be used in combination to support an eight port switch. Other configurations are also possible, e.g., a four chip configuration supporting a sixteen port switch.

Output bock 460 comprises output FIFO 462, scheduler 464, queue link memory 466, and queue descriptor memory 468. Output FIFO 462 is configured to store data received from shared memory 440 or from cut-through crossbar 426. Output FIFO 462 may be configured to store the data until the data forms an entire packet, at which point scheduler 464 is configured to output the packet. In another embodiment, output FIFO 462 may be configured to store the data until at least a predetermined amount has been received. Once the predetermined threshold amount has been received, then output FIFO 462 may begin forwarding the data despite not yet having received the entire packet. This is possible because the data is being conveyed to output FIFO 462 at a fixed rate. Thus, after a predetermined amount of data has been received, the data may be forwarded without fear of underflow because the remaining data will be received in output FIFO 462 before an underflow can occur. Queue link memory 466 and queue descriptor memory 468 are configured to assist scheduler 464 in reassembling packets in output FIFO 462.

Data that can be cut-through is routed directly through cut-through crossbar logic 426 and multiplexer 428 to the output FIFO 462, and then to the egress packet interface (e.g., a 16-bit output interface). Packets that can not be cut-through are stored in shared memory 440. These packets are added to one of several output queues. An internal scheduler selects packets from the various queues for transmission to an output port. The packet is read from the SRAM, passes through the output FIFO, and then sent to the egress packet interface. The ingress and egress packet interfaces may include interface logic such as buffers and transceivers, and physical interface devices (e.g., optics modules).

Next, one example of how a packet may be routed in the switch will be described. When a first packet arrives at an input port from the ingress packet interface, it is routed to input FIFO 402 for temporary storage. An entry for the packet is created and stored into packet descriptor memory 408. This new entry is reflected in packet free queue 406, which tracks which of the entries in packet descriptor memory 408 are free. Next, the packet is briefly examined to determine which output port(s) the packet is to be routed to. Note, each packet may be routed to multiple output ports, or to just a single output port. If the packet meets certain criteria for cut-through routing (described in greater detail below), then a cut-through request signal is conveyed to the corresponding output port(s). Each output port that will receive the packet may detect the signal requesting cut-through routing, and each output port makes its own determination as to whether enough resources (e.g., enough storage in output FIFO 462) are available to support cut-through. The criteria for determining whether an output port is available is described in detail below. If the output has the resources, a cut-through grant signal is sent back to the input port to indicate that cut-through is possible. The packet is then routed from input FIFO 402 to the corresponding output port's output FIFO 462 via cut-through crossbar 426.

If one or more of the packet's corresponding output ports are unable to perform cut-through, or if the packet does not meet the requirements for performing cut-through, then the process of writing the packet from input FIFO 402 to shared memory 440 begins. Cell assembly queue 422 effectively performs a serial-to-parallel conversion by dividing the packet into cells and storing the cells into shared memory 440. Information about the clusters allocated to the packet are stored in cluster link memory 404 (i.e., enabling the cells to be read out of shared memory 440 at some future point in time). As noted above, in early forwarding, shared memory 440 operates in a manner somewhat similar to a large FIFO memory. The packet is stored in a linked list of clusters, the order of which is reflected in cluster link memory 404. Independent of the process of writing the packet into shared memory 440, a packet identifier (e.g., a number or tag) is added to one output queue for each corresponding output port that will receive a copy of the packet. Each output port may have a number of output queues. For example, in one embodiment each output port may have 256 output queues. Having a large number of queues allows different priorities to be assigned to queues to implement different types of scheduling such as weighted fair queuing). Adding a packet number to one of these queues is accomplished by updating queue link memory 466 and queue descriptor memory 468. Scheduler 464 is configured to employ some type of weighted fair queuing to select packet numbers from the output queues. As noted above, details of one embodiment of scheduler 464 (also referred to as a scheduling unit) are described in U.S. patent application Ser. No. 09/685,985, titled "System And Method For Scheduling Service For Multiple Queues," by Oberman, et al., filed on Oct. 10, 2000.

Once a packet number is selected from one of the output queues, the corresponding packet is read from shared memory 440, reformatted into a serial stream by cell disassembly queue 424, and routed to the corresponding output FIFO 462. From the output FIFO the packet is eventually output to the network through the egress packet interface. However, unless store and forward routing is used (i.e., a worst case scenario from a latency standpoint), the process of reading the packet from shared memory 440 into output FIFO 462 begins before the entire packet has been stored to shared memory 440. In some cases, the process of transferring the packet from shared memory 440 to output FIFO 462 may begin even before the entire packet has been received in input FIFO 402. How soon the output port can begin reading after the input port has started writing depends on a number of different factors which are described in greater detail below. Block diagrams for the main link memories in the input block 400 and output block 460 are shown in FIGS. 3 and 4. More details of input block 400 and output block 460 are also described below.

Turning now to FIG. 2, details one embodiment of a packet descriptor 490 are shown. Note, as used herein a "packet descriptor" is different from a "packet identifier" (also called a "packet number"). While a packet descriptor stores information about a packet, a packet identifier is a number that identifies a particular packet that is being routed by the switch. Additional information may optionally be included in the packet identifier depending on the embodiment. As illustrated in the figure, this embodiment of the packet descriptor includes a queue count field 490A, a cluster count field 490B, an input flow number field 490C, a threshold group/virtual channel number field 490D, a cell list head field 490E, a cell list tail field 490F, a tail valid indicator bit 490G, an error detected indicator bit 489H, an indicator bit for packets that are to be dropped when scheduled 490I, a source port field 490J, and a high priority indicator field 490F. However, other configurations for packet descriptors are also possible and contemplated.

FIG. 3 illustrates details of one embodiment of cell link memory 404, packet free queue 406, and packet descriptor memory 408. As shown in the figure, packet free queue 406 comprises a linked list of pointers to free packet descriptors within packet descriptor memory 408. While different configurations are possible and contemplated, each packet descriptor may comprise a start or head pointer and an end or tail pointer to cluster link memory 404. Cluster link memory may comprise pointers to different memory locations within shared memory 440. In some embodiments, two free pointers (i.e., a free add pointer and a free remove pointer) may be used to access available locations within packet free queue 406. This causes packet free queue to act as a queue as opposed to a stack. This configuration may advantageously yield lower probability of soft errors occurring in times of low utilization when compared with a configuration that utilizes packet free queue 406 as a stack.

FIG. 4 illustrates details of one embodiment of queue descriptor memory 468 and queue link memory 466. Queue descriptor memory 468 may be configured to store pointers indicating the start and end of a linked list in queue link memory 466. Each entry in queue link memory 466 is part of a linked list of pointers to packet numbers for representing packets stored in shared memory 440.

Turning now to FIG. 5, a diagram illustrating one embodiment of the structure of input FIFO 402 is shown. Each input port may have its own input FIFO. The input FIFO may be configured to hold four cells 468A–D, wherein each cell contains 16 32-bit words. A separate routing control word (RCW) FIFO 464A–D may be included to hold four data words corresponding to the four RCWs that could be present for the four cells (i.e., assuming each cell contains a unique packet). A separate length FIFO 462A–D may also be included to hold the length of up to four packets that may be present in input FIFO 402. A separate set of 64 flip-flops 470 may be used to hold a 1-bit EOF flag, indicating whether the corresponding input FIFO word is the last word of a packet. A related set of four flip-flops 466A–D, one per cell, may be used to indicate whether an EOF exists anywhere within a cell. Note that the figure merely illustrates one particular embodiment, and that other embodiments are possible and contemplated.

FIG. 6 illustrates one embodiment of a set of pointers that may be used in connection with input FIFO 402 of FIG. 5. Pointers 472A–B point to the head and tail of FIFO 402, respectively. Pointer 474 points to the saved first cell for the currently read packet. Pointer 476 points to the word within the tail cell (as indicated by pointer 472B) that is being written to. Pointer 478 may be used to point to the word within the head cell (as indicated by pointer 472A) that is being read from for store-and-forward routing, while pointer 480 may be used to point to the word within the head cell that is being read from for cut-through routing. As described in greater detail below, cut-through routing forwards a received packet directly to an output port without storing the packet in shared memory 440. In contrast, early forwarding routing places received packets into shared memory 440 until the output port is available (e.g., several clock cycles later).

Figure 7:
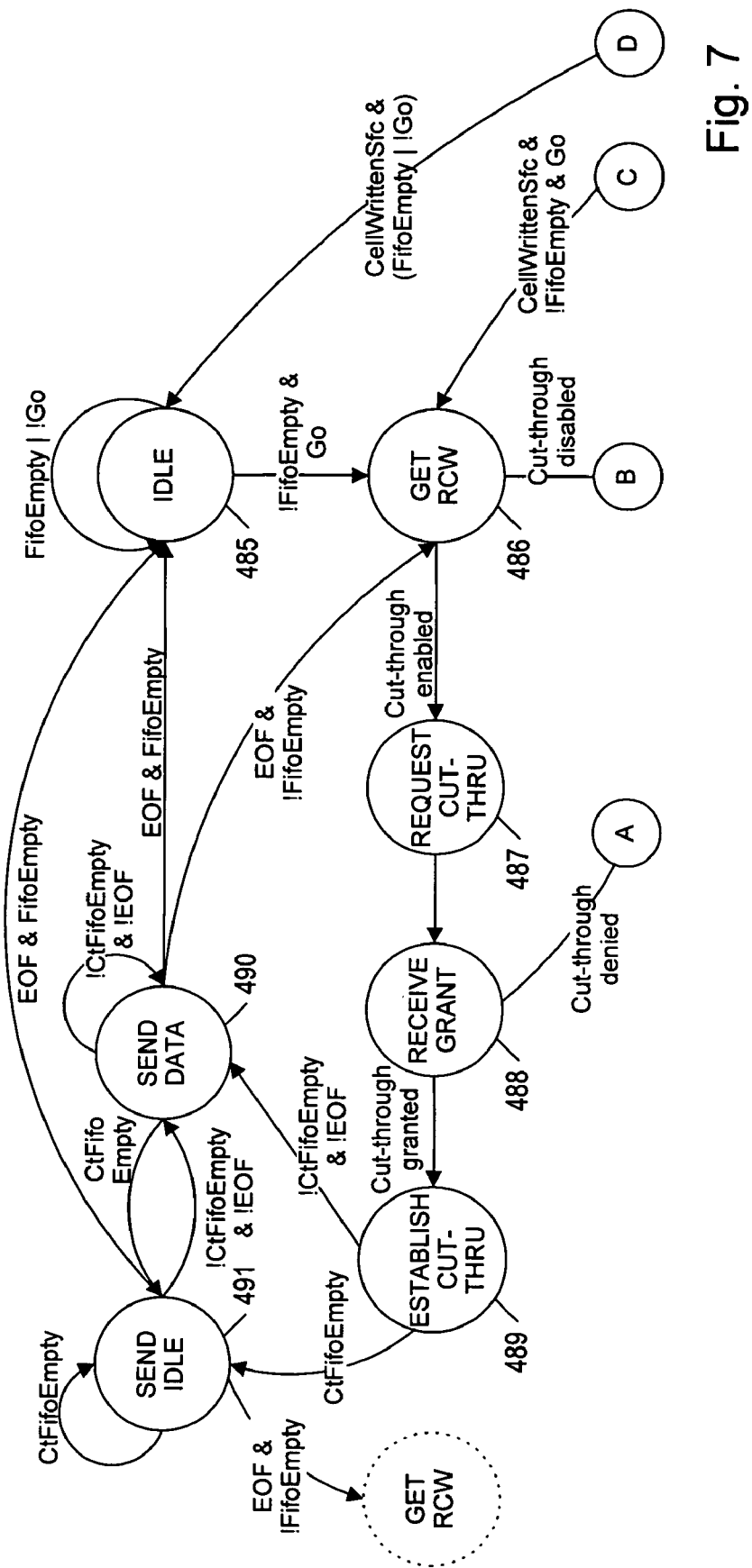
FIG. 7 illustrates one embodiment of a state machine that may be used to operate the input FIFO from FIG. 1.
Figure 7:
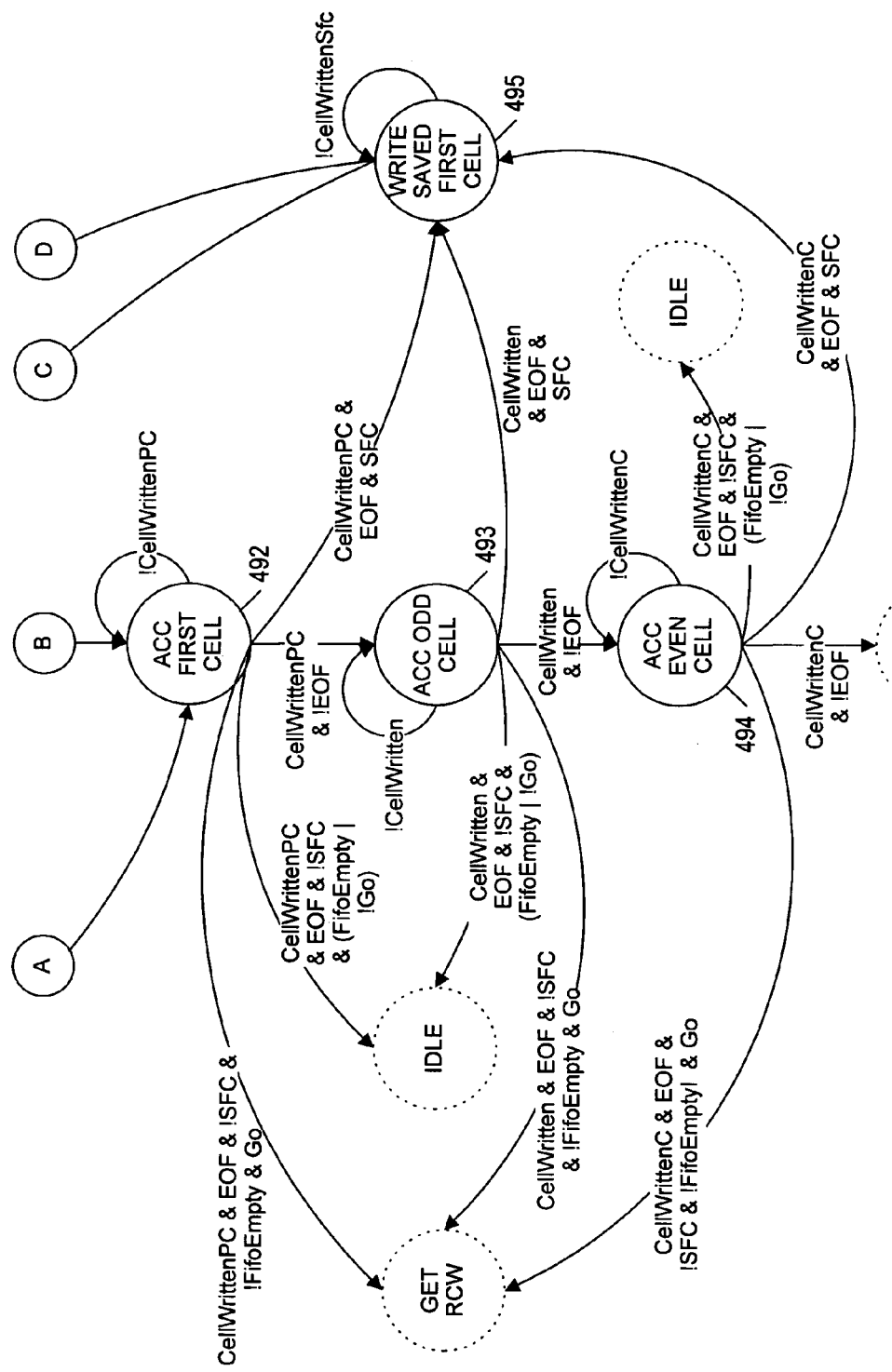

FIG. 7 illustrates one embodiment of a state machine that may be used to operate input FIFO 402 from FIG. 6. In some embodiments, the state machine of FIG. 7 may be implemented in control logic within input block 400. The input block 400 may include an input FIFO controller to manage both reads and writes from input FIFO 402. The controller may control reading of the input FIFO 402, extracting routing information for a packet, establishing cut-through (if possible), and sending the packet to shared memory 440 if cut-through is not possible or granted. Further, in cases where the length of a packet is written into the header, the controller may save the first cell of the packet in input FIFO 402. After reading and storing the rest of the packet, the controller may return to the saved first cell and write it to shared memory 440 with an updated length field. One potential advantage to this method is that it may reduce the processing required at egress. For example, in the case of a packet going from a Fibre Channel port to a Gigabit Ethernet port (i.e., an IP port), normally the packet would be stored in its entirety in the output FIFO so that the length could be determined and the header could be formatted accordingly. However, by saving the first cell in the input FIFO, the length of the packet may be determined once the packet has been completely written to shared memory. The header (in the first cell) may then be updated accordingly, and the first cell may be stored to shared memory. Advantageously, the packet is then ready to be output without undue processing in output block 460.

In one embodiment, the controller (i.e., state machine) may run at either an effective 104 MHz or 52 MHz, based upon whether it is a 1 Gbps or 2 Gbps port (e.g., with an actual clock frequency of 104 MHz). State transitions may occur every-other cycle in the 1 Gbps case, or every cycle in the 2 Gbps case. These are merely examples, however, and other configurations and operating frequencies are also possible and contemplated.

Figure 8:
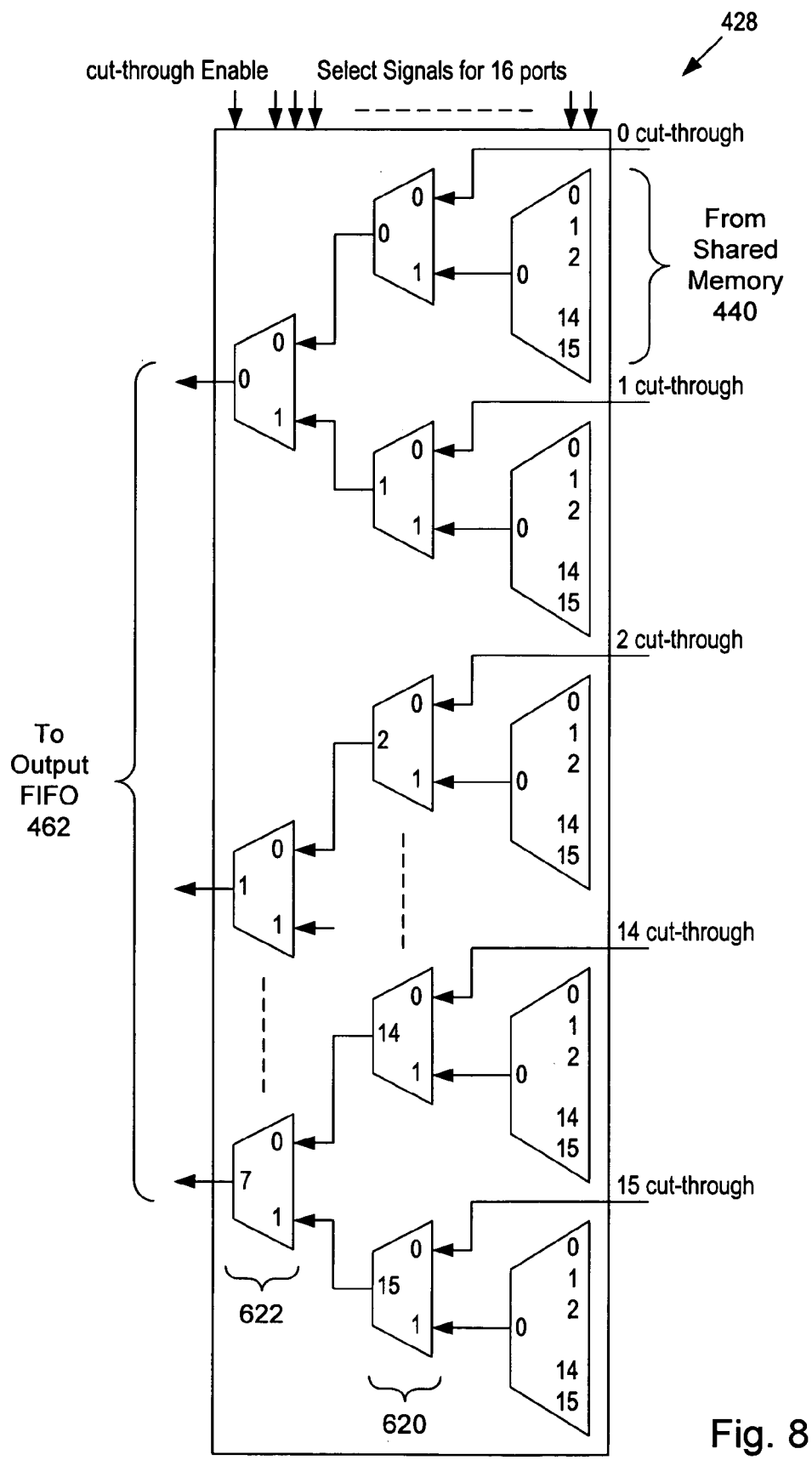
FIG. 8 is a diagram illustrating details of one embodiment of multiplexing logic within the data transport block of FIG. 1.

FIG. 8 is a diagram illustrating details of one embodiment of multiplexing logic 428 within data transport block 420. Multiplexing logic 428 selects the data that should be forwarded to the output port (i.e., via output FIFO 462). If early forwarding/store-and-forward routing is used, then multiplexing logic 428 will select the data coming from shared memory 440's read data port queue. If the data to be forwarded is a cut-through packet, multiplexing logic 428 selects the data from cut-through cross bar 426 and sends it to the output port depending on the select signals generated by the control logic. If cut-through routing is disabled, then the data from the shared memory 440 is forwarded. In one embodiment, multiplexing logic 428 is configured to only select the cut-through data for the ports for which cut-through routing is enabled. For all the other ports, the data from shared memory 440's read queues is forwarded.

The first set of multiplexers 620 select the input port data from which it needs to be cut-through depending on the port select signal generated by the cut-through master. Once the correct port data is selected, the next set of multiplexers 622 selects between the cut-through data or the data from the SRAM read queues. The control logic will clear the cut-through select bit once the cut-through forwarding is complete so that the data from shared memory 440 read queues is forwarded as soon as the cut-through is disabled.

To save pin count, in some embodiments two output ports may share one data bus. In this configuration the data from two adjacent ports is multiplexed and sent to the output block. For example, in 1 Gb mode, port N uses the first 104 MHz clock and port N+1 uses the second 104 MHz clock for the data. This means that the effective data-rate per port in 1 Gb mode is 52 MHz. In 2 Gb mode, each cycle contains data for port N, and thus the effective data-rate is 104 MHz. However, other configurations and operating speed are also possible and contemplated.

Figure 9:
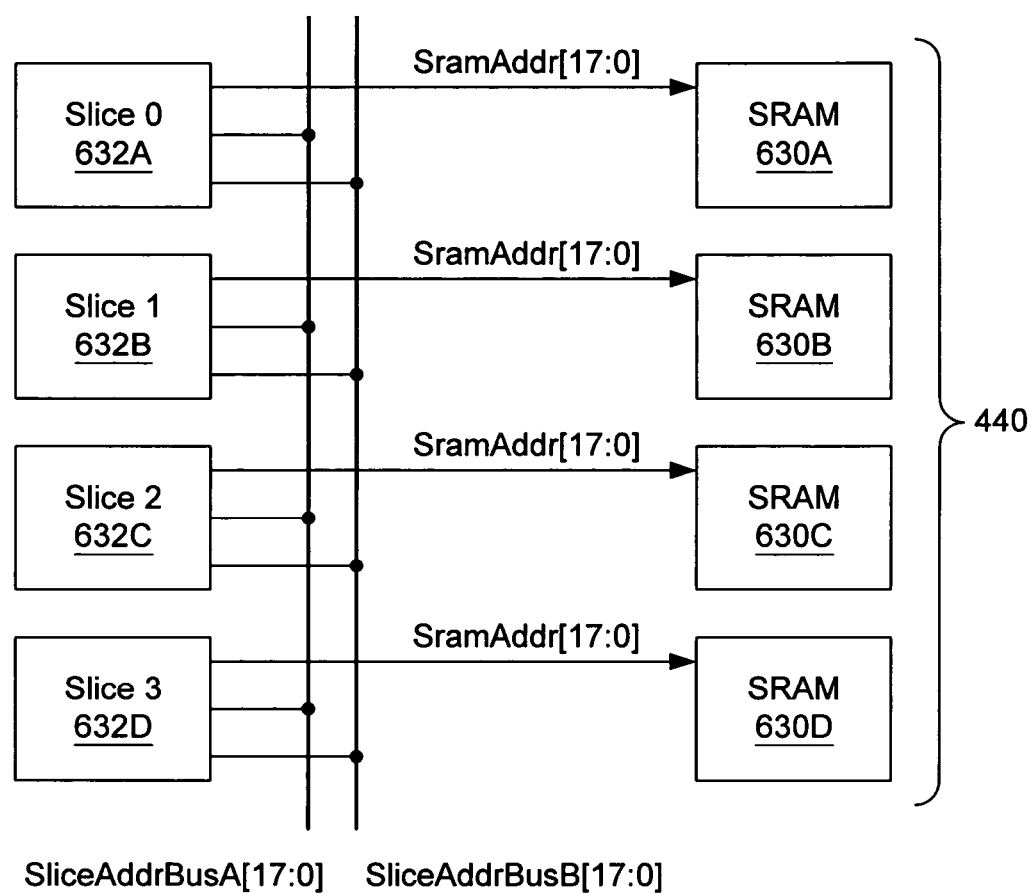
FIG. 9 illustrates details of one type of address bus configuration that may be used with the shared memory (RAM) of FIG. 1.

FIG. 9 illustrates details of one type of address bus configuration that may be used with shared memory 440. As shown in the figure, shared memory 440 may be divided into a plurality of blocks 630A–D, wherein each block corresponds to a slice 632A–D (i.e., one portion of input block 400, data transport block, and output block 460). For example, shared memory 440 may be 8 megabytes of SRAM (static random access memory), with each slice 632A–D accessing its own block 630A–D that is 2 MB of external SRAM. Note, shared memory 440 may be implemented using any type of random access memory (RAM) with suitable speed characteristics.

In this embodiment, the interface between the slices 632A–D and the external SRAM blocks 630A–D is a logical 128-bit data bus operating at 104 MHz, but other bus configurations are possible. However, it is possible for any slice to read from another slice's SRAM block; the full data interface across four slices is 512-bits, with data distributed across all of the four external SRAM blocks 630A–D. As a result, any given slice needs to address all four SRAM blocks whenever it needs to do an SRAM read or write access. This leads to a number of different possibilities for how the address buses can be arranged between the slices and shared memory 440. Some of these options include using some form of shared global address bus that is time division multiplexed (TDM) between the 16 ports.

In one embodiment, all slices share a single global TDM address bus connected to all SRAM blocks. However, it may be difficult to drive this bus at higher frequencies (e.g., 104 MHz) because the bus would have to span the entire motherboard and have multiple drops on it. In another embodiment, two 52 MHz TDM global address buses are used. Ports 0 and 2 on the slice drive address bus A on positive edges of the 52 MHz clock, and ports 1 and 3 drive address bus B on negative edges of the 52 MHz clock. An external multiplexer is then be used in front of each SRAM block (e.g., selected by a 52 MHz clock and with the two global buses as inputs). The output of the multiplexer is fed to a flip-flop clocked by the 104 MHz clock. With this timing, there are two 104 MHz cycles for the inter-slice address buses to travel and meet the setup timing to the 104 MHz flip-flop. There is one 104 MHz cycle for the output address bus from the multiplexer to meet the setup timing to the SRAM pins. Other configurations and timings are possible and contemplated.

Figure 10:
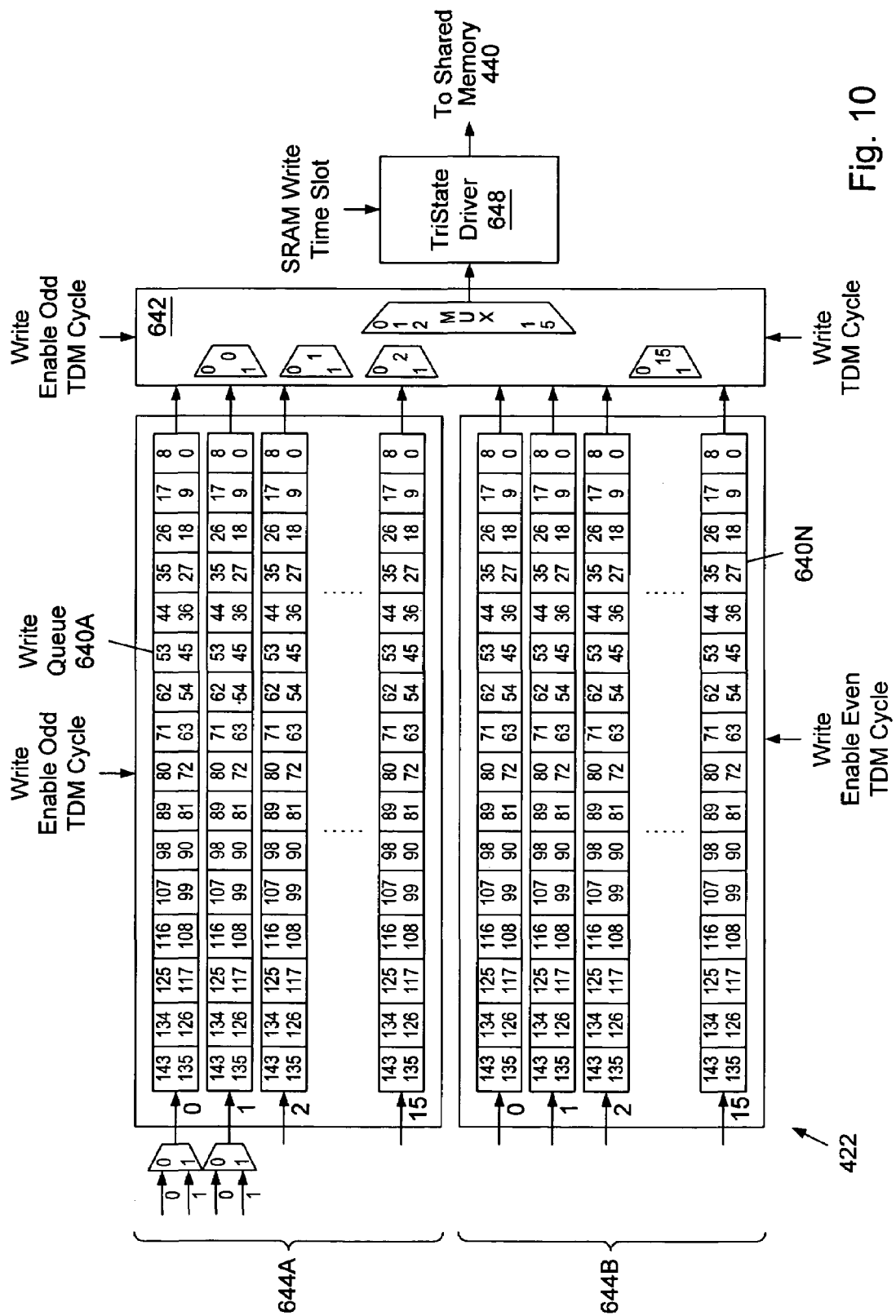
FIG. 10 illustrates one embodiment of a cell assembly queue within the data transport block of FIG. 1.

For example, in yet another embodiment, the multiplexer and flip-flop are integrated into data transport block 420 and switch fabric 140. This configuration may use two extra sets of 18-bit address pins on the switch fabric 140 chip to support bringing the two effective 52 MHz shared buses into and out of the chip. A port drives the shared address bus in the TDM slot of the output port that requested the data. In all other slots, it receives the addresses that are sent on the buses and repeats them onto the local SRAM bus. This embodiment is illustrated in FIG. 10. Note that in this embodiment the buses may be clocked at a higher frequency (e.g., 104 MHz), while the data rate (e.g., 52 MHz) is achieved by driving the addresses on the buses for two consecutive cycles.

FIG. 10 illustrates one embodiment of cell assembly queue 422 within data transport block 420. As shown in the figure, assembly queue 422 receives 8 data transport buses coming into the slice and writes the lower 9-bits of the data into the respective SRAM write queue 640. One motivation behind performing cell assembly is to increase bandwidth for embodiments that have wide ports to shared memory 440. However, if cells are used it may be desirable to configure the system to have greater memory bandwidth than the total port bandwidth in order to achieve desirable performance levels. For example, when a packet is received, additional information (e.g., overhead including routing control information and IP header information for Fibre Channel packets) is added to it. A worst case scenario may occur when the packet is less than 64 bytes long, but the overhead added to the packet causes it to be greater than 64 bytes long (e.g., 66 bytes long). In this situation, a second cell is used for the final 2 bytes of the packet. Thus, to ensure that the switch is not unduly limiting the performance of the network, a 2× speed up in total memory bandwidth compared with total line bandwidth may be desirable.

In one embodiment, it takes a complete TDM cycle to accumulate 144-bits for a single 1 Gbs port (128 bits of data and 16 control bits). After accumulating 144-bits of data, the data is written to shared memory 440 in the port's assigned write time-slot in the next TDM cycle. The data will be written into shared memory 440 in a time-slot within the same TDM cycle. Thus, while writing the accumulated data to shared memory 440 for a particular port, there may be additional input data coming from the port that continues to be accumulated. This is achieved by double buffering the write queues 640. Thus, data from the input ports is written to one side of the queue and the data to be written to shared memory 640 is read from the other side of the queue. Each port's 144-bits of accumulated write data is written to the shared memory in the ports assigned write time-slots. In this embodiment, every port is capable of writing a complete cell in a single TDM cycle.

In 2 Gb mode, 144-bits for a port are accumulated in one-half of a TDM cycle, i.e., in sixteen 104 MHz cycles. Each 2 Gb port has two time-slots, as well as a pair of cell assembly/disassembly queues. Thus, every 16 cycles one of multiplexers 642 in front of the cell assembly queues for ports N and N+1 switches the data from flowing into port N's cell assembly queue to flowing into port N+1's cell assembly queue. In this embodiment, when writing into port N's queue, port N+1's queue is neither write-enabled nor shifted. Similarly, when writing into port N+1's queue, port N's queue is neither write-enabled nor shifted. Each queue remains double-buffered, the same as in the 1 Gb mode. Both queues are written to SRAM, in their assigned time-slots.

Double buffering is achieved by having two separate set of queues 644A and 644B. At any given time, one set is configured for accumulating the data as it comes from the input block, and the other set is configured to write the accumulated data to shared memory 440. This behavior of the queues 644A–B is changed once every complete TDM cycle. In one embodiment, the queues are implemented as a shift register with 9-bits of data shifting right. In 1 Gb mode, the shifting may occur once every two 104 MHz cycles (once every 52 MHz cycle). In 2 Gb mode, the shifting may occur once every 104 MHz cycles. So after 16 writes, the data in the queue 422 will be as shown in FIG. 10. The queues are followed by two stages of multiplexers 642. The first stage of multiplexers are 2-1 multiplexers which are used to select between the two queues based on which one has accumulated the data and is ready to supply it to shared memory 440. The second stage of multiplexers are used to select between the different ports depending on the port's assigned write time-slot. The final selected 144-bits of data are written to shared memory 440. Tri-state driver 648 is used to tri-state the bus between queue 422 and shared memory 440 when it is in the read TDM slot.

Figure 11:
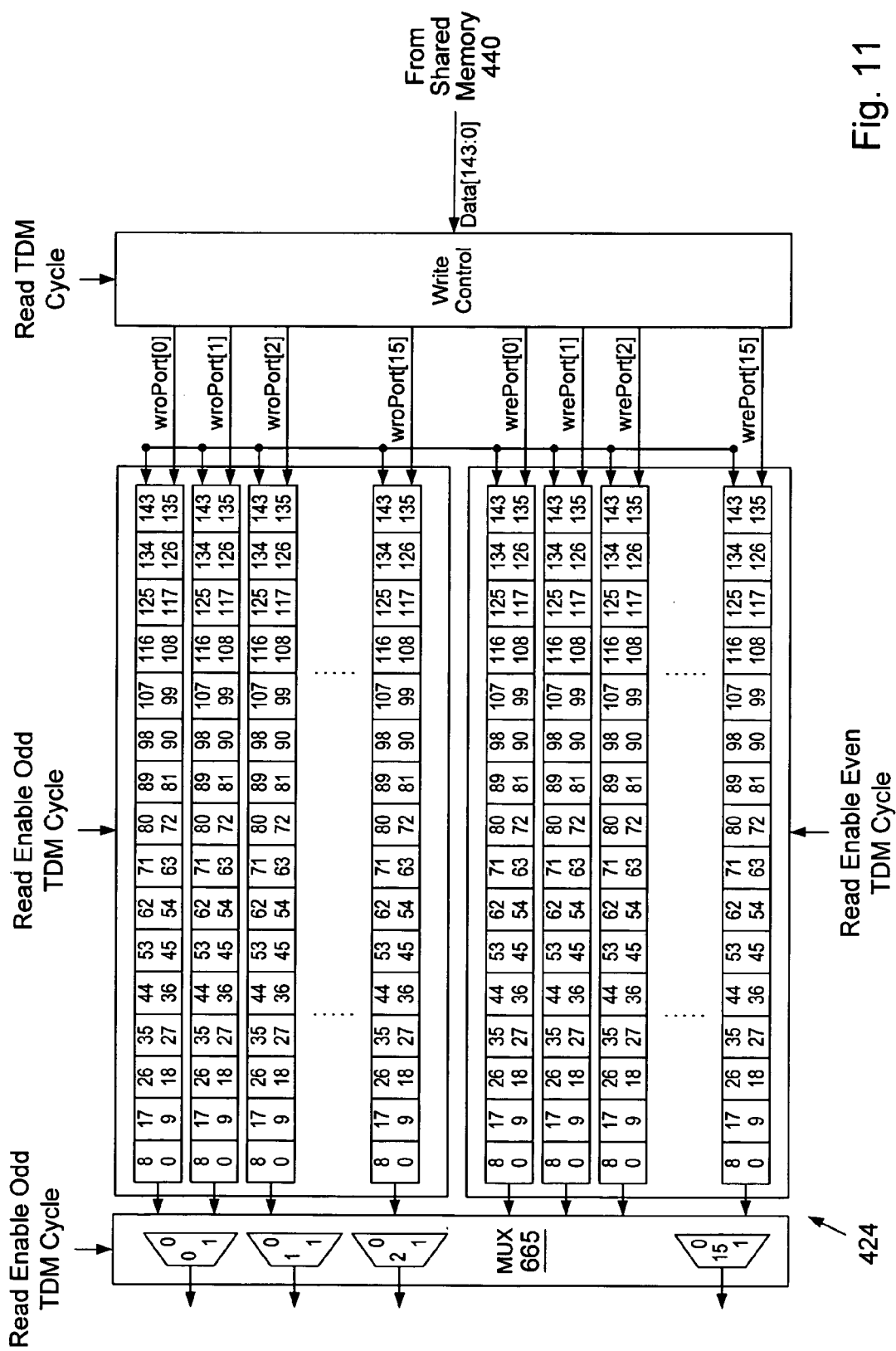
FIG. 11 is a diagram illustrating one embodiment of a cell disassembly queue.

Turning now to FIG. 11, one embodiment of cell disassembly queue 424 is shown. In this embodiment, each port reads 144-bits of data from shared memory 440 in its TDM read time-slot. In cut-through forwarding, data transport block 420 is provided with which output ports the packet is being forwarded to, but in the store-and-forward routing mode, data transport block 420 does not have this visibility. Instead, the control logic to read the packet is in input block 400. Input block 400 reads the packet in the output port TDM read time-slot, so the packet is forwarded to the correct output port.

Shared memory 440 write data is written into double-buffered cell disassembly queues 424. Similar to cell assembly queues 422, the data read from shared memory 440 is written to one side of the double-buffered queues while the data sent to the output ports is sent from other side of the buffer. In one embodiment operating in 1 Gb mode, it may take the entire TDM cycle to read the 16 entries out of the back-buffered cell disassembly queue. In this embodiment, the data is clocked out one word every two 104 MHz cycles from a given queue. Data path multiplexers 665 then switch between the words of adjacent ports to be sent over the inter-slice data path at 104 MHz. In 2 Gb mode, the 16 entries may be read out in one-half of a TDM cycle from the double-buffered cell disassembly queue 424. In this case, data is clocked out one word every 104 MHz cycle. Data path multiplexers 665 then switch between ports N and N+1 every 16 cycles, rather than every cycle, such that contiguous data flows at a data rate of 104 MHz. Note, that the timing given herein is merely for explanatory purposes and is not meant to be limiting. Other operating frequencies are possible and contemplated.

In one embodiment, the data from shared memory 440 is read 144-bits at a time in every read TDM cycle. Based on the read TDM time-slot, the write to the respective port is asserted by the write control logic within queue 424. The write control logic also asserts the corresponding enable signal. In the queues 424, the data order in which the data is sent to the output block is the same order in which the data is received from input block 400. Every cycle, the data sent to output block 460 is from the lower 9-bits of each queue. That means in every other 104 MHz cycle (1 Gb mode), or every 104 MHz cycle (2 Gb mode), the data is shifted to the left so that the next set of data to be sent to output block 460 is in the lower 9-bits of the bus. The output multiplexers 424 select the data from the side of the shared memory that is not writing the data and send the 9-bits to output block 460.

Figure 12:
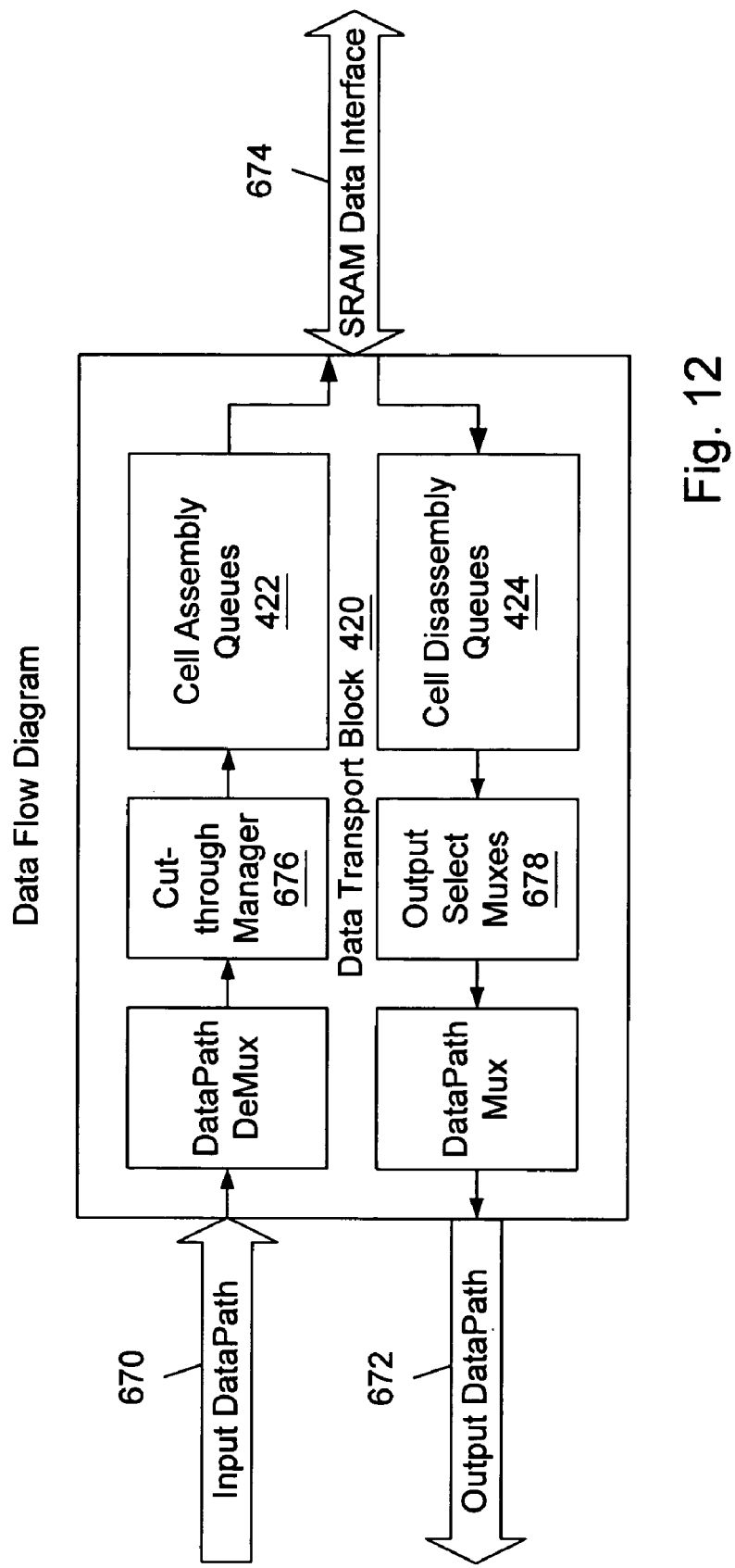
FIG. 12 is a data flow diagram for one embodiment of the data transport block from FIG. 1.

FIG. 12 is a data flow diagram for one embodiment of data transport block 420. Input data path 670 connects data buses (e.g., 10-bits wide) from the input blocks 400 of all slices. The tenth bit communicates a "cut-through" command, while the other nine bits carry data from input blocks 400. The cut-through command may be used to establish a cut-through connection between the input and output blocks. In the case of cut-through, the input data can be sent directly to the output data buses. For early forwarding/store-and-forward routing, the data is sent to the cell-assembly queues 422 and shared memory 440.

In one embodiment, output data path 672 connects to the 9-bit data buses of the output blocks of all slices. These data buses are used to carry data to the output blocks. The output data can be sent directly from the input data buses, in the case of cut-through, or for store-and-forward, be sent from the cell-disassembly queues 424.

In another embodiment, the shared memory data interface 674 may provide a means for storing and retrieving data between the switch fabric 140 and shared memory 440. In this embodiment, the interface is 144-bit wide and includes 128-bits for data and 16 control bits. This results in each 32-bit data word having four control bits. Each data word may have one end of file (EOF) bit and an idle bit. The other two bits may be unused.

In one embodiment, the 144-bit bus is a TDM bus that operates at 104 MHz. In each of the first 16 cycles, 144-bits may be read from shared memory 440 and transferred into one of the cell disassembly queues 424. The 17th cycle is a turnaround cycle when no data is sent or received. Then in each of the second 16 cycles, the 144-bit contents of one of the cell assembly queues 422 are transferred to the SRAM across the bus. The 34th cycle is a turnaround cycle when no data is sent or received. This TDM cycle then repeats.

All the slices may be synchronized with each other so that they drive the shared memory bus and the inter-slice messaging bus in their respective time-slots. Two signals, SYNC_IN and SYNC_OUT are used to achieve this synchronization. SYNC_IN of data transport block 420 is connected to the SYNC_OUT of input block 400. SYNC_OUT of data transport block 420 is connected to the SYNC_IN of output block 460. As shown FIG. 12, cut-through manager 676 controls the cut-through select signals sent to the output select multiplexers. Output select multiplexers 678 are the final set of multiplexers to select the correct data to be forwarded to output block 460.

Cut-Through

As noted above, in many cases network switch performance is measured as latency when the switch is not congested (i.e., when the destination port can immediately accept the data packet). While network switches will most often operate in a congested state in typical real-world applications, non-congested latency has nevertheless become an important performance benchmark.

To reduce non-congested latency, cut-through routing may be employed. The term cut-through implies routing a packet from an input port to the packet's corresponding destination output port without storing the packet in an intervening random access memory. Cut-through switching works by providing a special low latency path for routing a packet when the destination port is available.

Figure 13:
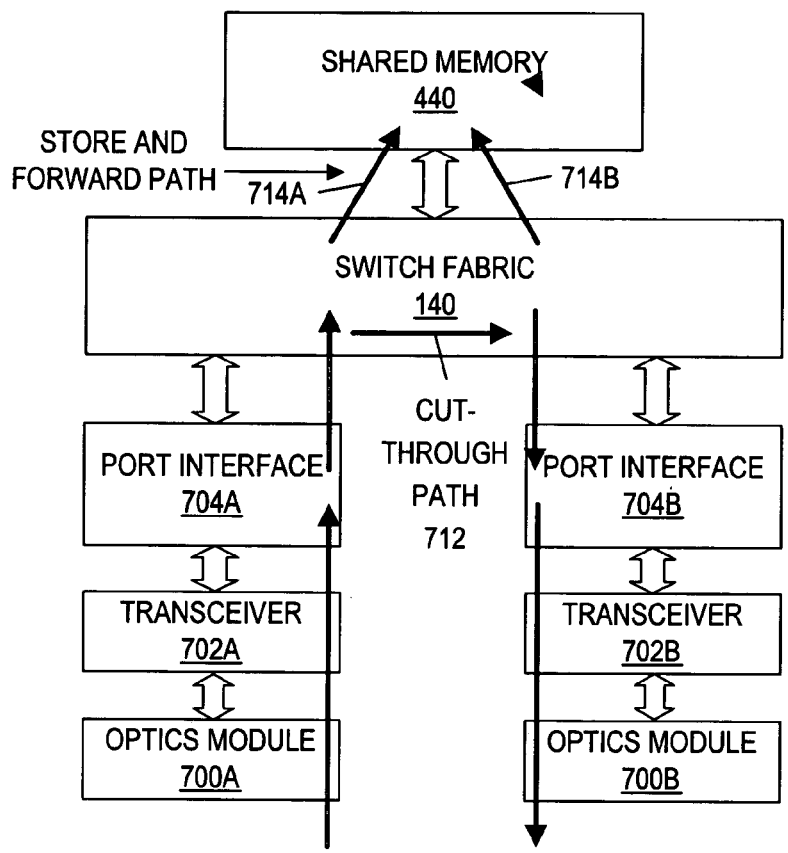
FIG. 13 is a block diagram illustrating one embodiment of a network switch configured to perform cut-through routing.

Turning now to FIG. 13, a block diagram illustrating one embodiment of a network switch configured to perform cut-through routing is shown. FIG. 13 also provides more information on the context of switch fabric 140 and shared memory 440 within one embodiment of a network switch. Data packets are received by optics module 700A, which may be used to interface with a fiber optic network. Note, in some embodiments optics modules 700A–B may be replaced with copper interfaces. Optics module 700A may receive the data packets as an optical signal and convert the optical signal into an electrical signal that is in turn conveyed to transceiver 702A. Transceivers 702A–B may be configured to perform bus interface functions and convey the data packets to/from port interfaces 704A–B, respectively. Port interfaces 704A–B may, in some embodiments, include portions of input block 400 and/or output block 460. In some embodiments that support Storage over Internet Protocol (SOIP), port interfaces 704A–B may also be configured to perform some of the encapsulation process used to place storage (e.g., Fibre Channel) packets within IP Ethernet packets.

Arrows 714A and 714B illustrate the early forward/store and forward path that packets take. As data corresponding to a particular packet is received by port interface 704A, it is forwarded to switch fabric 140 and then stored in shared memory 440. Once the following conditions are met, switch fabric 140 will read the stored packet from shared memory 440 and forward it to port interface 704B for output to transceiver 702B and optics module 700B:

a) the entire packet has been stored in shared memory 440;

b) the output port (i.e., port interface 704B) is available; and c) no other higher priority packets are available to be routed to the output port.

As noted above, an output port may be said to be available when the port has sufficient resources available to handle the incoming packet (e.g., when no other packets are waiting to be output). The output port may be configured to signal its availability if the output FIFO has enough storage available to store a maximum-sized packet. In one embodiment, this may be a maximum size Fibre Channel packet. Thus, if the output port's output FIFO does have not have enough storage available to accept a maximum size Fibre Channel packet, it signals that cut-through is not available. In some implementations, the actual number of bytes that must be available in an output FIFO to allow cut-through may be programmable (e.g., stored in a programmable register referred to as the "cut-through threshold register—the number of 32-bit words that must be available in the output FIFO"). In one embodiment, the number of bytes may equal a maximum packet size plus some amount to compensate for overhead added within the switch. Since the output FIFO may not be large enough to handle "jumbo" packets (e.g., up to 9 kilobytes), these may be automatically routed using early forwarding/store and forward techniques. The process of determining whether the output has sufficient resources to handle a cut-through packet is described in greater detail below (see "Potential problems with cut-through" below).

Arrow 712 illustrates one embodiment of cut-through routing, which conveys the packet to output port interface 704B without storing the packet in shared memory 440. As noted above, however, as soon as the switch becomes even slightly congested, then port interface 704A and switch fabric 140 will switch to store-and-forward routing instead of cut-through routing. For example, if two ports simultaneously send data to the same destination port, only one packet may be cut-through routed while the other packet is routed via the early forwarding/store-and-forward technique.

Cut-through routing may become more difficult when the source and destination ports operate at different data rates, e.g., a 1.0625 Gbps Fibre Channel port and 1 Gigabit Ethernet port. For example, if a higher frequency port is cut-through to a slower port, the slower port may have to be configured with a large enough output FIFO to prevent overflow. This is described in greater detail below (see "Potential problems with cut-through" below).

Figure 14:
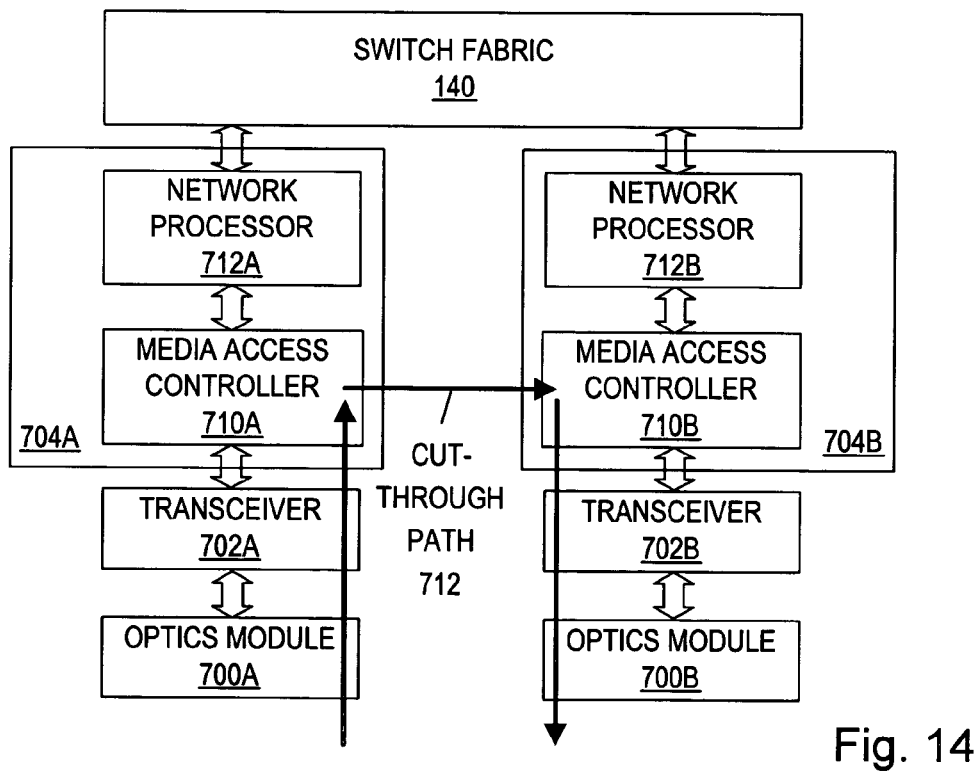
FIG. 14 is a block diagram of another embodiment of a network switch configured to perform cut-through routing.

Turning now to FIG. 14, another embodiment of a network switch configured to perform cut-through routing is shown. In this embodiment, however, the switch is configured with a cut-through routing path that may further reduce latency by bypassing some of the stages of the port interfaces (compare port interfaces 704A–B with media access controllers 710A–B and network processors 712A–B). However, depending upon the exact implementation, cut-through may be restricted to packets that do not require modification (e.g., translation from Ethernet to Fibre Channel, or vice versa).

Figure 15:
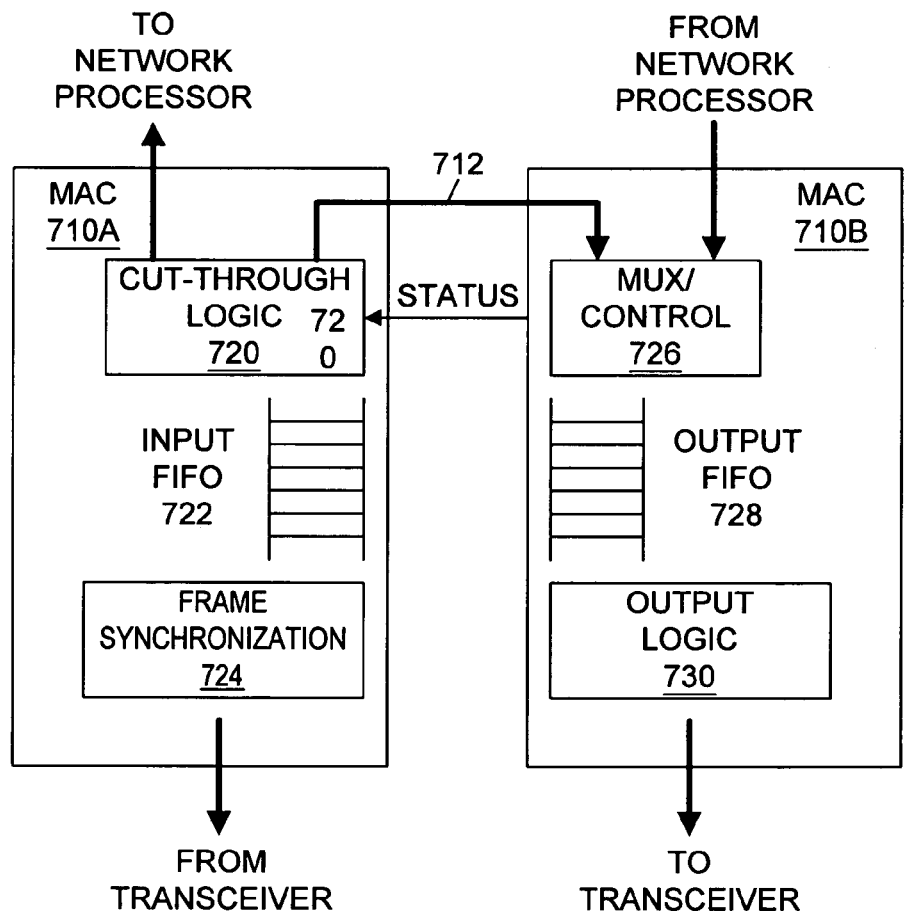
FIG. 15 illustrates details of one embodiment of the media access controllers from FIG. 14.

Turning now to FIG. 15, details of one embodiment of media access controllers 710A–B are shown. In this embodiment, media access controller 710A includes cut-through logic 720, input FIFO memory 722, and packet synchronization logic 724, while media access controller 710B includes multiplexing and control logic 726, output FIFO memory 728, and output logic 730. Note that for simplicity the figure only shows one cut-through connection between the two media access controllers 710A and 710B. Since each port is bi-directional, there may be a similar path from media access controller 710B to media access controller 710A. Similarly, media access controller 710A may have its own multiplexing and control logic 726, output FIFO 728, and output logic 730, while media access controller 710B may have its own cut-through logic 720, input FIFO 722, and packet synchronization logic 724.

Figure 16A:
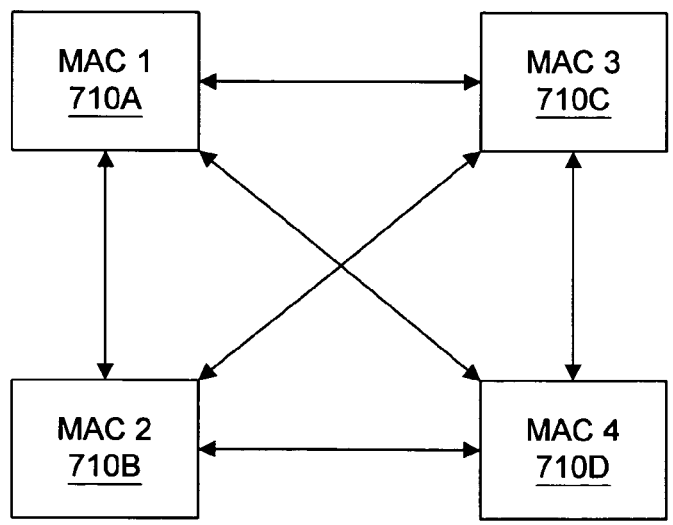
FIGS. 16A–C illustrate different embodiments of cut-through interconnections in one embodiment of a four-port switch.
Figure 16B:
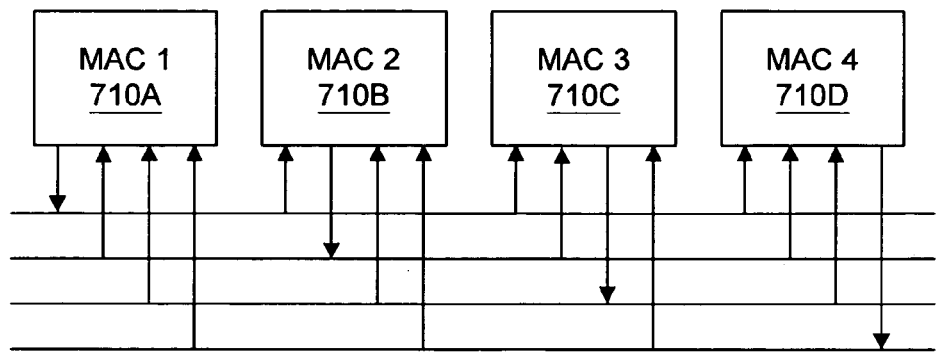
Figure 16C:
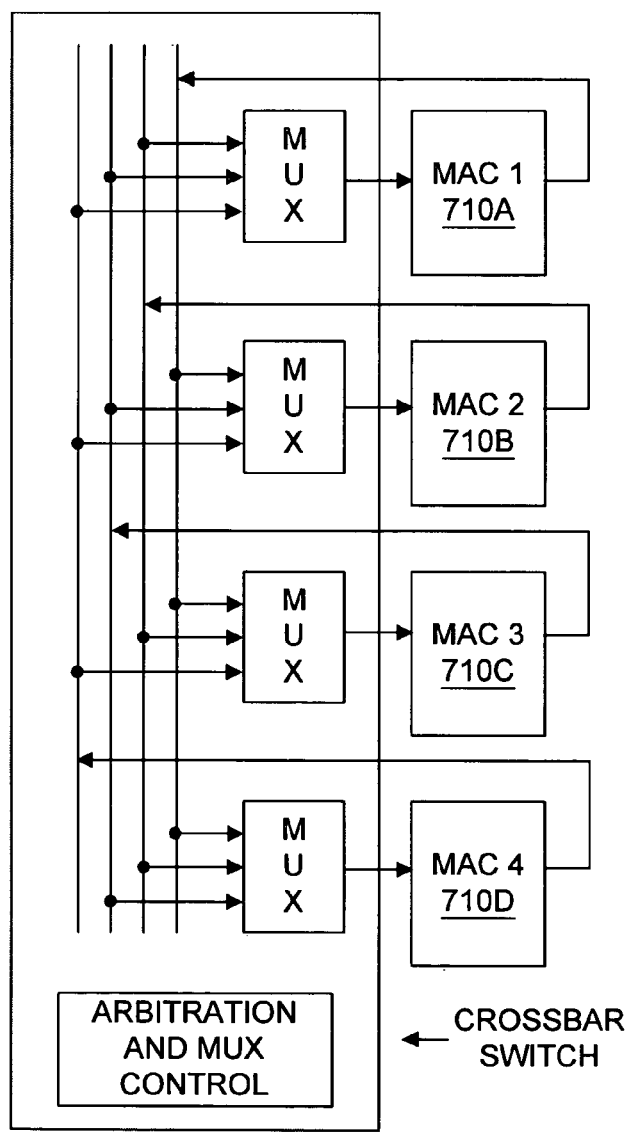

Turning now to FIGS. 16A–C, three diagrams of the cut-through interconnections in a four-port switch are shown. In these embodiments, for an n-port switch there are n−1 destination ports. As shown in the figures, in one embodiment a classic crossbar switch configuration may be utilized, except that each port cannot be routed to itself.

Potential Problems with Cut-Through

When implementing cut-through routing, there are several potential problems that may need to be avoided depending on the implementation. First, out-of-order packet transmission may be a problem. This problem may arise if a packet is currently being routed through the switch fabric when a packet on the same input port is cut-through to the output port. For example, assume packet X is received while the destination port is busy. This packet would be routed normally using store-and-forward (i.e., through the switch fabric 140 and memory 440). Packet X+1 could be received for the same destination port before packet X has propagated through the switch fabric. If the destination port becomes free, packet X+1 could be cut-through and transmitted out of order. Therefore, it may be advantageous to implement a mechanism within the input and/or output port's control logic to prevent cut-through from an input port if packets from that port have been routed to the network processor/switch fabric but have not yet been received by the destination output port. In one embodiment, the input port may be configured to wait a predetermined number of clock cycles before requesting cut-through for another packet destined for the same output port. In each input port, information about the timing of when the last packet was sent to each output port may be stored. In the event that a packet suitable for cut-through routing is received, the input port may compare the current time with the time stored for the corresponding destination output port. If the difference in time is greater than or equal to a predetermined maximum propagation time then the input port may request cut-through routing for the packet. If the difference in time is less than the predetermined maximum propagation time, then the input port may be configured to route the packet normally. The predetermined maximum propagation time may be set to equal the time required for a packet identifier to propagate through the switch and arrive on a queue and the output port to detect the identifier on the queue. Thus, this solution is best when a guaranteed maximum propagation time can be determined.

For embodiments in which it is difficult or impossible to establish a reasonable maximum propagation time, the input port may be configured to assign a unique sequence number for each packet. A unique sequence may be applied for each different queue in each different destination port. The unique sequence number may be included in the header that accompanies the packet through the switch. The unique sequence number may also be sent to the output port as part of the cut-through request process. The output port may be configured to track sequence numbers for packets coming from each input port, and the output port may be configured to deny cut-through unless the sequence number for the last packet (from the corresponding output queue) read from RAM (i.e., that originated from the input port requesting cut through) into the output's FIFO is one less than the sequence number accompanying the cut-through request. This may be implemented by having a number of registers at each output port to track the current position in the sequence for each input port.

As noted above, speed mismatches between ports may also cause problems. When the input port and output port are not operating at the same speed, the potential for the output FIFO to overflow or under-run exists. Overrun can occur when the input port is faster than the output port. In this case, the output FIFO is being filled faster than it can be drained. Therefore, to prevent these problems, in some embodiments cut-through from a faster port may be allowed only if there is sufficient space in the output FIFO to prevent overrun. Alternatively, a flow control mechanism may be implemented for the cut-through interface to prevent overrun.

Under-run of the output FIFO can occur when the output port is faster than the input port resulting in the FIFO being drained faster than it is being filled. Therefore, in some embodiments cut-through from a slower port may be allowed only if the output port preloads its output FIFO with sufficient data (from the packet being cut-through) to prevent under-run for the maximum size packet.

Another potential problem may be that the output port is unavailable. For example, the output port may be not be able to transmit because the interface's flow control has been asserted. The flow control can pause the interface for Gigabit Ethernet or, for a Fibre Channel port, because there may be a shortage of buffer credit. In these cases, the output FIFO may be overrun unless the FIFO has sufficient space to hold the entire data packet being cut-through (e.g., by comparing the available space with the programmable amount stored in the cut-through threshold register, e.g., a bit more than a Fibre Channel maximum frame size).

Preventing Under-Run During Cut-Through

In some embodiments, an additional set of registers (called cut-through preload registers) may be used to implement cut-through routing. For example, at each output port there will be 16 such registers (one per input port) for each output port may be implemented at each input port. These registers may be programmed with a value that specifies how many 32-bit words must be received from the corresponding input port before the output port may start outputting the packet. These registers prevent under-run on the output port's output FIFO when packets from a slower speed input port are routed to a faster speed output port. In one embodiment, the values programmed in these registers may be calculated as follows:

(TotalWordsinPacket−BufferSize)
*FastSpeed=TotalWordsinPacket*SlowSpeed
BufferSize=TotalWordsinPacket*(FastSpeed−SlowSpeed)/FastSpeed where
TotalWordsinPacket=Maximum packet size in 32-bit words
=Maximum Payload+Maximum Encapsulation Words+EH+SOF+EOF+CRC
=528+Maximum Encapsulation Words+1+1+1+1
=532+Maximum Encapsulation Words
BufferSize=Number of words needed to be buffered
FastSpeed=Speed of the faster port
SlowSpeed=Speed of the slower port For example, if the Maximum Encapsulation Words equals 24, then the value to be programmed in the corresponding cut-through preload register equals 83.4 (which may be rounded up to 84). Note, in some cases when using cut-through routing from Gigabit Ethernet to 1.0625 Gbps Fibre Channel, it is still possible to under-run the output FIFO, even though the packet is being routed from a faster speed port to a slower speed port. This is because the input packet is an SOIP packet, and there are several words that are stripped and/or modified by the network processor and the Input block as part of the processing. This may result in a gap of invalid data between the initial start-of-packet markers and the remaining data of the packet. Thus, in one embodiment this under-run may be avoided by setting the minimum number of words necessary to be buffered at the fabric's output FIFO to two. This ensures that the SOF (start of packet) and next valid word is received before starting to output the packet from the output FIFO. If the number of words being modified is non-zero, then these words will follow immediately after the SOF word in the input stream to the fabric. Thus, a generalized formula for words to buffer may be two plus the number of words modified.

As noted above, in some cases a switch may be configured to prevent cut-through routing for packets from input ports with different speeds relative to the destination output ports. However, in some embodiments it maybe possible to support certain speed differentials. Examples of routings that may be possible with cut-through routing include 1.0625 Gbps Fibre Channel TO 1.25 Gigabit Ethernet (using BufferSize≧80 words) and 1.25 Gigabit Ethernet TO 1.0625 Gbps Fibre Channel (using BufferSize≧2+number of words modified).

If, however, the output port is not available for cut-through (or all destination output ports are not available for multicast packets), then the pack is store-and-forwarded by first storing the packet in shared memory 440 and then retrieving the packet at some later time and sending the packet to the destination port interface 704B. Another case in which cut-through routing may be unavailable is for packets that are destined for a management CPU. As noted in FIG. 1, multiple chips may be used to implement the multi-port switch. A management CPU may be used (e.g., four switching chips and one management CPU) to oversee operation of the switch (e.g. to perform configuration, initialization and other switch management functions). Since the packets destined for the management CPU are not typically as time critical as other packets, and since the number of packets destined for the management CPU is typically a small number, providing cut-through for these packets may not be worth the additional complications in some embodiments.

Preventing Under-Run during Early Forwarding

As noted above, if a packet has not been cut-through routed, then the packet may be considered for early forwarding. In some embodiments, certain conditions may be placed on the packet before early forwarding is attempted to reduce the chance of input/output FIFO over/underflow. For example, if the packet is received on a Fibre channel "Virtual Channel" and the total number of clusters available for the Virtual Channel on the input port is less than a predetermined constant (e.g., stored in a software programmable register), then early forwarding may not be started until more clusters are available. The predetermined constant may be stored in a programmable register. The predetermined constant may be greater than or equal to the maximum packet size in clusters for the largest packet that can come on that particular port. This may aid in ensuring that a packet will not run out of clusters, after it has been early forwarded.

Additional criteria may be employed if the packet is on a "threshold group". In general, threshold group packets are subject to dropping at the input port when the resource allocation limits (associated with the port and the threshold level) are exceeded. The basic idea behind thresholding is to drop lower priority traffic so that the fabric resources are available for use by higher priority traffic. Examples of additional criteria that may be used for threshold group packets include (a) requiring that the total number of clusters available for all groups on the chip should be greater than or equal to a limit value stored in a software programmable register; and (b) requiring that the total number clusters available for the particular group on the chip should be greater than or equal to the limit value. Both conditions may need to be met because high priority packets may steal away resources from threshold groups. The limit value may be set to be greater than or equal to the maximum packet size in clusters for any of the mode 0 or mode 2 ports on that chip. As used herein, a mode 0 port is configured as a Gigabit Ethernet port that does not generate pause packets and has data flow that is regulated via input thresholding. A mode 1 port is configured as a Gigabit Ethernet port that can negotiation generation and reception of pause packets. A mode 2 port is a mode 0 port that can also handle credit-based virtual channels. The switch may be configured to monitor internal watermarks and send resource usage information to the input blocks. This may assist in ensuring that a packet will not run out of clusters after it has been early forwarded.

Preferably, the switch may be configured to determine if enough data has been buffered (in shared memory and the input FIFO) to prevent under-run on the output FIFO before early forwarding is started. This may be determined by checking an early forwarding threshold register for each output port and making sure that the amount of buffered up data is greater than the maximum value stored in the registers. The early forwarding threshold registers may be programmed with non-zero values when going from a slower speed port to a faster speed port according to the following formula:

$$(TotalCellsinPacket-BufferSize)$$
$$*FastSpeed=TotalCellsinPacket*SlowSpeed$$
$$BufferSize=TotalCellsinPacket*(FastSpeed-SlowSpeed)/FastSpeed$$

where
TotalCellsinPacket=Maximum packet size in cells
=ceiling [(532+Maximum Encapsulation Words)/16]
BufferSize=Number of cells needed to be buffered
FastSpeed=Speed of the faster port
SlowSpeed=Speed of the slower port
For example, if Maximum Encapsulation Words=24, then the TotalCellsinPacket equals 35 cells.

For different cases of slow port to fast port, assuming a maximum packet size of 2112 bytes (e.g., 33 cells assuming a cell size of 64 bytes), example values for the early forwarding threshold register are:

| | |
|---|---|
| 1.0625 Gbps Fibre Channel TO 1.25 Gigabit Ethernet | BufferSize ≧ 6 cells; |
| 1.0625 Gbps Fibre Channel TO 2.125 Gbps Fibre Channel | BufferSize ≧ 17 cells; |
| 1.25 Gigabit Ethernet TO 2.125 Gbps Fibre Channel | BufferSize ≧ 14 cells. |

For same-speed to same-speed transmission, the early forwarding threshold register may be set to a minimum of one cell to accommodate embodiments that utilize cells for accessing shared memory. Similarly, for early forwarding from a Gigabit Ethernet to 1.0625 Gbps Fibre Channel, under run (i.e., resulting from the network processor stripping and modifying words in the header) may be prevented by setting the early forwarding threshold register to the following value which accounts for the number of words that the network processor modifies/replaces:

1.25 Gigabit Ethernet TO 1.0625 Gbps Fibre Channel BufferSize≧1+⌈(2+Number of words modified)/16⌉.

As with cut-through routing, in some embodiments early forwarding may also be prevented on a port-by-port or packet-by-packet basis.

As noted above, in some embodiments the switch may support different interfaces on different ports (e.g., Fibre Channel and Ethernet). When performing cut-through routing of packets between ports of the same interface, the packet is normally not modified. In other words, the switch behaves like an OSI layer 2 switch (see below for description of the OSI model). However, when the port interfaces are different, the packets are modified. Normally, this function would be performed by the network processor, but as noted above in some embodiments the network processor is bypassed for cut-through packets. Therefore, in some embodiments the following processing is performed:

(a) Fibre Channel to Gigabit Ethernet. The Fibre Channel packet is encapsulated within an SoIP™ data packet with the appropriate addressing;

(b) Gigabit Ethernet to Fibre Channel. The SoIP™ data packet is de-encapsulated to extract the data packet which will be forwarded to the Fibre Channel port;

(c) Gigabit Ethernet to Gigabit Ethernet. A Gigabit Ethernet packet may be modified if the switch is performing routing functions (i.e., OSI layer 3 functions); and (d) Fibre Channel to Fibre Channel. A Fibre Channel packet may be modified when the switch is implementing a virtual arbitrated loop.

The "OSI model" referred to above stands for Open System Interconnection model, which is an International Standards Organization (ISO) standard for worldwide communications that defines a networking framework for implementing protocols in seven (7) layers as shown in FIG. 17. Control is passed from one layer to the next, starting at the application layer in one station, proceeding to the bottom layer, over the channel to the next station and back up the hierarchy. Most of the functionality in the OSI model exists in all communications systems, although two or three OSI layers may be incorporated into one. OSI is also referred to as the OSI Reference Model or just the OSI Model.

Disabling Cut-Through

Depending on the implementation, there may be several different mechanisms for disabling cut-though. One such mechanism disables cut-through routing on a packet-by-packet basis. For example, each packet may be assigned a routing control bit that indicates whether or not it should be considered for cut-through routing. As noted above, one case in which a packet may not be considered for cut-through routing is if the packet is a jumbo packet or if the packet is larger than the destination output port's output FIFO.

In another configuration, the media access controller may be designed to include the capability to disable the cut-through function on a per-port basis. There are at least two reasons for providing this capability. First, store-and-forward switches do not typically forward data packets which are flawed (i.e. runt packets, packets with bad CRC, etc). A cut-through switch forwards packets before it is known whether the packets are bad. Therefore, bad packets cannot be filtered in typical manner. In general, if the error rate is low, this filtering will not provide a significant benefit since the end nodes will eventually discard the flawed packets. However, if a section of the network is consistently generating errors, isolating the flaw by using port statistics information is more difficult with cut-through enabled since each port that receives a bad packet will record the error. Therefore, a system administrator may choose to disable cut-through globally to aid in isolating the source of packet errors.

A second reason for allowing cut-through to be disabled concerns the cut-through process itself. In the event that the cut-through logic is flawed, it may be disabled. Advantageously, this may allow the switch to still function normally as a store-and-forward switch. In one embodiment of the network switch, there are 4 different combinations of cut-through depending on the source and destination ports—Fibre Channel (FC) or Gigabit Ethernet (GE): FC to FC, GE to GE, FC to GE, and GE to FC. Since it is possible that the logic for one or more of these combinations may be flawed, selective disablement of the cut-through function may also be implemented in some embodiments based on the type of packet and the type of output port. In one embodiment, a default setting for the cut-through function may be to disable all cut-through functionality following a reset. In this embodiment, the cut-through may be enabled only if explicitly enabled by the management processor in the switch.

Example of Switching Packets

Figure 18:
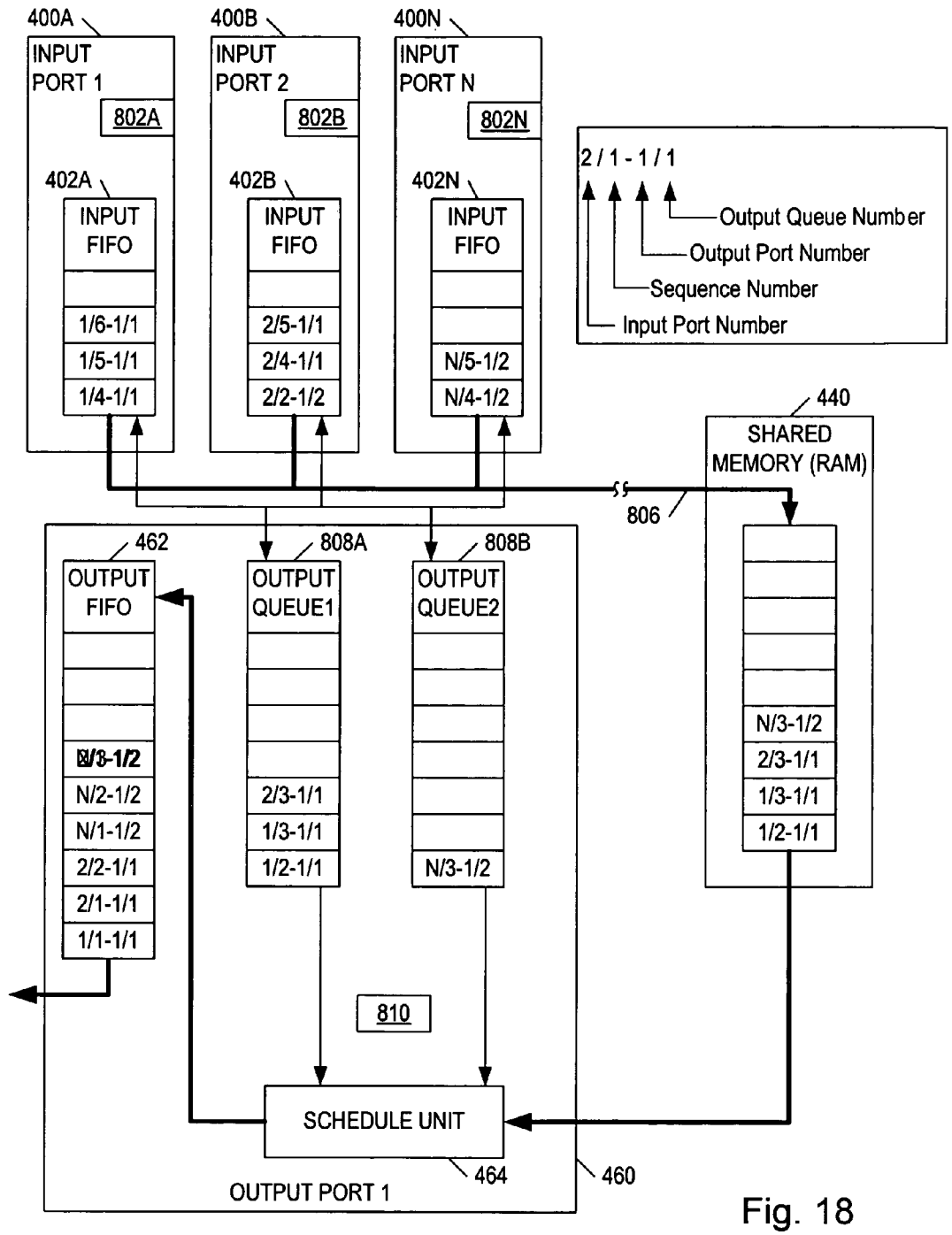
FIG. 18, details of one embodiment of the network switch from FIG. 1 are shown.

Turning now to FIG. 18, details of one embodiment of the network switch from FIG. 1 are shown. In this example, packets are received in input ports 400A–N and routed to output port 460 either by cut-through routing or by early forwarding through RAM 440. As shown in the figure, each input port 400A–N receives packets and stores them in input FIFOs 402A–N. For cut-through packets, the packets are directly stored to the corresponding output FIFO (e.g., output FIFO 462). For non-cut-through packets (e.g., early forward packets), a packet identifier is stored on the corresponding output queue. The packet identifier may contain different information depending on the exact implementation. For example, the packet identifier may include the packet's input port number and sequence number. Note, while a common notation is used in the figure for convenience, output queues 808A–B may be configured to only store selected information about a packet, while input FIFOs 402A–N, output FIFOs 808A–B, and RAM 440 store the actual packet data.

Examples of two different methods for ensuring that packet order is maintained in the switch will now be described. In the first method, a sequence is defined for each input port/output port combination. For example, in a switch with 4 input ports and 4 output ports, a total of 16 sequences would be defined. Each packet received by a particular input port is examined to determine which output port it is destined for, and then the packet is assigned a number from the sequence corresponding to the packet's input-output port combination. As the figure illustrates, each input port may include one or more registers 802A–N that are configured to store current sequence numbers corresponding to each output port. The sequence number assigned to the packet may be stored as part of an internal header that is routed through the switch with the packet. When output port 460's schedule unit 464 schedules a current packet from one of output queues 808A–B, it examines the current packet's sequence number and compares it with a previous packet's sequence number that is stored in output sequence register 810. If the current packet's sequence number is greater than that stored in output sequence register 810, the current packet's sequence number is stored into output sequence register 810. In this way, register 810 is repeatedly updated to indicate the last maximum sequence number (LMSN) per input port. Thus, assuming the same 4 input port and 4 output port configuration described above, output sequence register 810 would store 4 LMSN's. Each output port would have its own output sequence register 810, each storing 4 LMSN's, for a total of 16 stored LMSN's in the switch.

In the event that a particular input port receives a packet and attempts to request cut-through routing for the packet, the packet's sequence number could be compared with the LMSN stored in the destination output port's output sequence register. If the packet that is requesting cut-through routing has a sequence number that is one greater than the corresponding LMSN stored in the destination output port's output sequence register, and if all of the output port's output queues are empty, then cut-through may be granted (assuming all other conditions for cut-through such as sufficient output FIFO resource availability are met). This process may ensure that no previous packets are in the switch to jeopardize the proper packet ordering.

In another embodiment, a second method may be used to ensure proper packet ordering. In this method, registers 802A–N are configured to store current sequence numbers for each input port/output queue combination (which differs from the previous method, which stored sequences for each input port/output port combination). Thus, assuming a 4 input port, 4 output port switch, with each output port having 4 output queues, registers 802A–N would store a total of 64 sequences. Similarly, each output port would store one LMSN for each output queue/input port combination (e.g., 64 LMSN values assuming the same switch configuration as above).

As with the previous method, if a packet that is requesting cut-through routing has a sequence number that is one greater than the corresponding LMSN stored in the destination output port's output sequence register, and if all of the output port's output queues are empty, then cut-through may be granted (assuming all other conditions for cut-through such as sufficient output FIFO resource availability are met). With this method it may also be possible, however, in some embodiments to check that only the corresponding output queue is empty, rather than all output queues. However, this could lead to scheduling fairness issues if packets are repeatedly cut-through ahead of older packets waiting in other queues.

In the example shown in the figure, the second method described is implemented (i.e., a different sequence for each input port/output queue combination). Assuming (1) that the method only checks that the particular output queue of interest is empty (i.e., in contrast to checking all of the output port's output queues), and (2) that packet [N/3-1/2] has been scheduled by schedule unit 464, then packet [2/2-1/2] may be capable of cut-through routing because its corresponding output queue (i.e., output queue 808B) would be empty and there would be no intervening packets waiting in the switch. Since packet [2/1-1/2] has already been scheduled (as shown by the packet's presence on output FIFO 462), the LMSN stored in register 810 corresponding to the input port 1/output queue 2 combination would have a value of one. Since the requesting packet's sequence is next in the sequence (i.e., two), cut-through is possible if output queue 808B is empty (assuming the other conditions for cut-through are met).

Note, the two methods describe above are merely examples. Other variations are also possible and contemplated. For example, the output port may be configured to convey the corresponding LMSN to the input port for comparison instead of the input conveying the requesting packet's sequence number to the output port.

A system and method for selecting low latency paths through a network switch have been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

The invention claimed is:

1. A method for switching packets in a network switch, the method comprising:
   receiving data forming a packet, wherein the data is received from a source input port of a plurality of input ports that are part of the network switch, wherein the packet is to be routed to at least one destination output port of a plurality of output ports that are part of the network switch, wherein each output port comprises a plurality of output queues, wherein the source input port and the destination output port operate at different data rates;
   determining whether the destination output port has sufficient resources available to handle the data without causing an overflow by:
     requesting cut-through routing from the destination output port in response to receiving the data; and
     conveying a signal granting cut-through to the source input port if the destination output port has sufficient resources available to handle the data;
   refraining from requesting the cut-through routing for packets larger than the destination output port's first-in first-out memory (FIFO);
   routing the data to the destination output port if a grant cut-through signal is received; and
   if a grant cut-through signal is not received:
     storing the data to a random access memory;
     storing a packet identifier on one of the destination port's output queues;
     waiting until the destination output port has sufficient resources available; and
     transferring the data from the random access memory to the destination output port.

2. The method of claim 1, wherein said routing is started before said receiving is complete to implement the cut-through routing.

3. The method of claim 1, wherein said transferring is started before said receiving and said storing are complete to implement early forward routing.

4. The method of claim 1, wherein said transferring is started after said storing is complete to implement store and forward routing.

5. The method of claim 1, wherein said routing is performed without storing the data in an intervening random access memory.

6. The method as recited in claim 1, further comprising:
   storing the data received in the destination output port in the output first in first out memory (FIFO); and
   determining whether the output FIFO has a predetermined amount of available storage space before performing said storing, wherein said predetermined amount of available storage space is stored in a programmable register.

7. The method as recited in claim 6, wherein said predetermined amount of available storage is a function of the maximum packet size.

8. The method as recited in claim 1, further comprising creating and storing a packet descriptor for the packet, wherein the packet descriptor is stored in a linked list.

9. The method as recited in claim 1, wherein said routing the data is performed to all output ports simultaneously that are destinations for the packet and that have sufficient resources available.

10. The method as recited in claim 1, wherein said transferring the data from the random access memory to the destination output port is performed once for each output port that is a destination for the packet.

11. The method as recited in claim 1, wherein said switching the packet comprises encapsulating the packet in a Storage Over IP (SOIP) packet if the packet is a Fibre Channel packet and the output port is an Ethernet port.

12. The method as recited in claim 1, wherein said storing comprises allocating clusters to the data, wherein each cluster comprises one or more cells, wherein each cell comprises a number of bytes equal to the width of the random access memory's interface.

13. A method for switching packets in a network switch, the method comprising:
   receiving data forming a packet, wherein the data is received from a input port of the network switch, wherein the packet is to be routed to at least one corresponding output port of a plurality of output ports that are part of the network switch, wherein each output port comprises a plurality of output queues, wherein the input port and the corresponding output port operate at different data rates, wherein the corresponding output port comprises an output first-in first-out memory (FIFO), wherein the input port is configured to store a packet identifier corresponding to the packet on one of the output port's output queues; and switching the packet by:
   (a) if the corresponding output port has resources available to handle the data, cut-through routing the data to the corresponding output port; and
   (b) if the corresponding output port does not have resources to handle the data:
     refraining from requesting the cut-through routing for packets larger than the corresponding output port's FIFO;
     storing the data to a random access memory; and
     in response to detecting that the random access memory has resources to handle the data, forwarding the packet to the output port from the random access memory, wherein the forwarding begins before the storing is complete.

14. A network switch comprising:
   a plurality of input ports configured to receive data forming one or more packets;
   a plurality of output ports configured to convey the packets out of the switch, wherein
   each output port comprises a plurality of output queues;
   wherein one or more of the input ports and one or more of the output ports operate at different data rates;
   a random access memory; and
   data transport logic coupled between the input ports, the output ports, and the random access memory,
   wherein a first input port is configured to request cut-through routing from at least one destination output port in response to receiving data corresponding to a first packet that is a candidate for cut-through routing, wherein the first input port is configured to refrain from requesting the cut-through routing for packets larger than the destination output port's output first-in first-out memory (FIFO),
   wherein the destination output port is configured to convey a signal granting cut-through to the first input port if the destination output port has sufficient resources available to handle the data corresponding to the first packet,
   wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic and to store a packet identifier on one of the destination port's output queues, wherein the output port is configured to read the data corresponding to the first packet from the random access memory via the data transport logic in response to having resources available for the data corresponding to the first packet.

15. The network switch as recited in claim 14, wherein each input port comprises an input port FIFO, wherein each output port comprises the output FIFO, wherein the input FIFO is configured to store received data until the received data is routed to the output FIFO or the random access memory.

16. The network switch of claim 14, wherein the destination output port is configured to ensure that a sufficient amount of data from the packet has been stored into the random access memory before starting to read the data corresponding to the first packet from the random access memory, thereby preventing an output under-run.

17. The network switch of claim 16, wherein the sufficient amount of data is programmable on a port-by-port basis.

18. The network switch of claim 16, wherein the sufficient amount of data is a function of the output port's line rate.

19. The network switch as recited in claim 14, wherein the input port is configured to store the data to the random access memory via the data transport logic in cells.

20. The network switch as recited in claim 14, wherein the input port is configured to allocate one or more clusters for each received packet, wherein each cluster comprises one or more cells, wherein each cell equals the size of the random access memory's interface.

21. The network switch as recited in claim 14, wherein each output port comprises the output FIFO, wherein each output port is configured to refrain from conveying the signal granting cut-through in response to the output port's output FIFO being more than a predetermined percentage full.

22. The network switch as recited in claim 14, wherein each output port comprises the output FIFO, wherein each output port is configured to refrain from conveying the signal granting cut-through in response to the output port's output FIFO having less than a predetermined number of bytes of available storage.

23. The network switch of claim 14, wherein each output port comprises the output FIFO, wherein the output port comprises a means for delaying the forwarding of the stored data to the output FIFO from the RAM until the RAM has received enough of the packet to ensure that the output port will not underflow.

24. The network switch of claim 14, wherein each output port comprises the output FIFO, wherein the input port comprises an input FIFO and a means for delaying the cut-through routing of a particular packet from the input FIFO to the corresponding output port's output FIFO until the input port has received enough of the particular packet to ensure that the input FIFO will not underflow.

25. The network switch as recited in claim 14, wherein the data transport logic includes a cross-bar switch configurable to route data from each input port to each output port.

26. The network switch as recited in claim 25, wherein the crossbar switch is configured to prevent data from a particular input port being routed back to the particular input port.

27. The network switch as recited in claim 14, wherein said network switch further comprises a network processor for each input port and each output port, wherein said network processors are configured to add an Ethernet prefix to packets in response to detecting that the packets are Fibre Channel packets and are being routed to Ethernet output ports.

28. The network switch as recited in claim 14, wherein the packets have variable lengths.

29. The network switch as recited in claim 14, wherein said input port is configured to generate a packet descriptor for each received packet, wherein the packet descriptor comprises at least the length of the corresponding packet and an identifier that identifies the corresponding output port to which the packet is to be routed.

30. The network switch as recited in claim 14, wherein said input port is configured to generate a packet descriptor for the packet, wherein the packet descriptor comprises an indication of the packet's priority.

31. The network switch as recited in claim 14, wherein said switch is configurable to disable cut-through routing on a port-by-port basis.

32. The network switch as recited in claim 14, wherein said switch is configurable to disable cut-through routing on a packet-by-packet basis.

33. The network switch as recited in claim 14, wherein said switch is configurable to disable early forwarding on a port-by-port basis.

34. The network switch as recited in claim 14, wherein said switch is configurable to disable early forwarding operations on a packet-by-packet basis.

35. The network switch as recited in claim 14, wherein said network switch is configurable to selectively disable cut-through operations from a particular type of input port to a particular type of output port.

36. The network switch as recited in claim 14, wherein the input ports are either Fibre Channel or Gigabit Ethernet, and wherein the output ports are either Fibre Channel or Gigabit Ethernet.

37. A network switch comprising:
a plurality of input ports configured to receive data forming one or more packets;
a plurality of output ports configured to convey the packets out of the switch, wherein each output port comprises a plurality of output queues;
wherein one or more of the input ports and one or more of the output ports operate at different data rates;
a management CPU;
a random access memory; and
data transport logic coupled between the input ports, the output ports, and the random access memory,
wherein a first input port is configured to request cut-through routing from at least one destination output port in response to receiving data corresponding to a first packet that is a candidate for cut-through routing,
wherein each of the plurality of input ports is configured to refrain from requesting cut-through for packets destined for the management CPU,
wherein the destination output port is configured to convey a signal granting cut-through to the first input port if the destination output port has sufficient resources available to handle the data corresponding to the first packet,
wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic and to store a packet identifier on one of the destination port's output queues, wherein the output port is configured to read the data corresponding to the first packet from the random access memory via the data transport logic in response to having resources available for the data corresponding to the first packet.

38. A network switch comprising:
a plurality of ports, wherein a first one of said ports is an input port configured to receive data forming a packet, wherein a second one of said ports is an output port configured to convey the packet out of the switch, wherein the output port comprises a plurality of output queues, wherein the input port operates at a different data rate than the output port, wherein the output port comprises an output first-in first-out memory (FIFO), wherein the input port is configured to store a packet identifier corresponding to the packet on one of the output port's output queues;
a random access memory (RAM); and
a means for routing the data between the input port, the RAM, and the output port, wherein the means for routing is configured to either route the packet directly to the output FIFO by cut-through routing or route the packet to the RAM for either early forwarding or store and forward routing, wherein the routing means is configured to refrain from requesting the cut-through routing if the packet is larger than the output FIFO, wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO.

39. The network switch of claim 38, wherein the forwarding is started before the entire packet is stored in the RAM.

40. The network switch of claim 38, wherein the forwarding is started before the entire packet is received by the input port.

41. The network switch of claim 38, wherein the output port comprises a means for delaying the forwarding of the stored data to the output FIFO until the RAM has received enough of the packet to ensure that the output port will not underflow.

42. The network switch of claim 38, wherein the output port comprises control logic and an availability register, wherein the availability register is configured to store a value that the control logic compares with the amount of storage available in the output FIFO to determine if a signal granting cut-through should be transmitted to the input port.

43. The network switch of claim 42, wherein the value stored in the availability register is selected to prevent under-run on the output FIFO when packets from a slower speed input port are routed to a faster speed output port.

44. The network switch as recited in claim 38, wherein the input port is configured to store the packet to the RAM by allocating clusters and cells to the packet.

45. The network switch as recited in claim 38, wherein said switch is configurable to selectively disable cut-through routing and early forwarding.

46. The network switch as recited in claim 38, wherein the input port is either Fibre Channel or Gigabit Ethernet, and wherein the output port is either Fibre Channel and Gigabit Ethernet.

47. A network switch comprising:
a management CPU;
a plurality of ports, wherein a first one of said ports is an input port configured to receive data forming a packet, wherein a second one of said ports is an output port configured to convey the packet out of the switch, wherein the output port comprises a plurality of output queues, wherein the input port operates at a different data rate than the output port, wherein the output port comprises an output first-in first-out memory (FIFO), wherein the input port is configured to store a packet identifier corresponding to the packet on one of the output port's output queues, wherein the input port is configured to refrain from requesting cut-through for packets destined for the management CPU;
a random access memory (RAM); and
a means for routing the data between the input port, the RAM, and the output port, wherein the means for routing is configured to either route the packet directly to the output FIFO by cut-through routing or route the packet to the RAM for either early forwarding or store and forward routing, wherein the routing means is configured to refrain from requesting the cut-through routing if the packet is larger than the output FIFO, wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO.

48. A network switch comprising:
a plurality of input ports configured to receive data forming one or more packets;
a plurality of output ports configured to convey the packets out of the switch;
a random access memory; and
data transport logic coupled between the input ports, the output ports, and the random access memory,
wherein an input port is configured to request cut-through routing from at least one destination output port in response to receiving data corresponding to a first packet that is a candidate for cut-through routing, wherein the input port is configured to refrain from requesting the cut-through routing for packets larger than the destination output port's output first-in first-out memory (FIFO),
wherein the destination output port is configured to convey a signal granting cut-through to the input port if the destination output port has sufficient resources available to handle the data corresponding to the first packet,
wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet;

wherein each output port comprises a plurality of output queues, wherein, in response to not receiving the grant cut-through signal, the input port is configured to store a packet identifier on one of the destination port's output queues.

49. A network switch comprising:

a plurality of input ports configured to receive data forming one or more packets;

a plurality of output ports configured to convey the packets out of the switch;

a random access memory; and data transport logic coupled between the input ports, the output ports, and the random access memory, wherein an input port is configured to request cut-through routing from at least one destination output port in response to receiving data corresponding to a first packet that is a candidate for cut-through routing, wherein the input port is configured to refrain from requesting cut-through routing for packets larger than the destination output port's output FIFO;

wherein the destination output port is configured to convey a signal granting cut-through to the input port if the destination output port has sufficient resources available to handle the data corresponding to the first packet, wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet.

50. A network switch comprising:

a plurality of input ports configured to receive data forming one or more packets;

a plurality of output ports configured to convey the packets out of the switch;

a random access memory; and data transport logic coupled between the input ports, the output ports, and the random access memory, wherein a input port is configured to request cut-through routing from at least one destination output port in response to receiving data corresponding to a first packet that is a candidate for cut-through routing, wherein the input port is configured to refrain from requesting the cut-through routing for packets larger than the destination output port's output first-in first-out memory (FIFO), wherein the destination output port is configured to convey a signal granting cut-through to the input port if the destination output port has sufficient resources available to handle the data corresponding to the first packet, wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet;

wherein the destination output port is configured to ensure that a sufficient amount of data from the packet has been stored into the random access memory before starting to read the data corresponding to the first packet from the random access memory, thereby preventing an output under-run.

51. A network switch comprising:

a plurality of input ports configured to receive data forming one or more packets;

a plurality of output ports configured to convey the packets out of the switch;

a random access memory; and data transport logic coupled between the input ports, the output ports, and the random access memory, wherein a input port is configured to request cut-through routing from at least one destination output port in response to receiving data corresponding to a first packet that is a candidate for cut-through routing, wherein the destination output port is configured to convey a signal granting cut-through to the input port if the destination output port has sufficient resources available to handle the data corresponding to the first packet, wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet;

wherein each output port comprises an output FIFO, wherein the output port comprises a means for delaying the forwarding of the stored data to the output FIFO from the RAM until the RAM has received enough of the packet to ensure that the output port will not underflow, wherein the input port is configured to refrain from recluesting the cut-through routing for packets larger than the output FIFO.

52. A network switch comprising:

a plurality of input ports configured to receive data forming one or more packets;

a plurality of output ports configured to convey the packets out of the switch;

a random access memory; and data transport logic coupled between the input ports, the output ports, and the random access memory, wherein a input port is configured to request cut-through routing from at least one destination output port in response to receiving data corresponding to a first packet that is a candidate for cut-through routing, wherein the destination output port is configured to convey a signal granting cut-through to the input port if the destination output port has sufficient resources available to handle the data corresponding to the first packet, wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet;

wherein each output port comprises an output FIFO, wherein the input port comprises an input FIFO and a means for delaying the cut-through routing of a particular packet from the input FIFO to the corresponding output port's output FIFO until the input port has received enough of the particular packet to ensure that the input FIFO will not underflow, wherein the input port is configured to refrain from reclueusting the cut-through routing for packets larger than the corresponding output port's output FIFO.

53. A network switch comprising:

a plurality of input ports configured to receive data forming one or more packets;

a plurality of output ports configured to convey the packets out of the switch;

a random access memory;

data transport logic coupled between the input ports, the output ports, and the random access memory,
wherein a input port is configured to request cut-through routing from at least one destination output port in response to receiving data corresponding to a first packet that is a candidate for cut-through routing, wherein the destination output port is configured to convey a signal granting cut-through to the input port if the destination output port has sufficient resources available to handle the data corresponding to the first packet, wherein, in response to receiving the grant cut-through signal, the input port is configured to route the data corresponding to the first packet to the destination output port via the data transport logic, and wherein in response to not receiving the grant cut-through signal, the input port is configured to store the data to the random access memory via the data transport logic, wherein the output port is configured to read the data corresponding to the first packet from the random access memory via the data transport logic in response to having resources available for the data corresponding to the first packet; and a management CPU, wherein each of the plurality of input ports is configured to refrain from requesting cut-through for packets destined for the management CPU.

54. A network switch comprising:

a plurality of ports, wherein a first one of said ports is an input port configured to receive data forming a packet, wherein a second one of said ports is an output port configured to convey the packet out of the switch, wherein the output port comprises an output first-in first-out memory (FIFO);

a random access memory (RAM); and a means for routing the data between the input port, the RAM, and the output port, wherein the means for routing is configured to either route the packet directly to the output FIFO by cut-through routing or route the packet to the RAM for either early forwarding or store and forward routing, wherein the routing means is configured to refrain from requesting the cut-through routing for packets larger than the output FIFO;

wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO;

wherein the output port comprises a plurality of output queues, wherein the input port is configured to store a packet identifier corresponding to the packet on one of the output port's output queues.

55. A network switch comprising:

a plurality of ports, wherein a first one of said ports is an input port configured to receive data forming a packet, wherein a second one of said ports is an output port configured to convey the packet out of the switch, wherein the output port comprises an output first-in first-out memory (FIFO);

a random access memory (RAM); and a means for routing the data between the input port, the RAM, and the output port, wherein the means for routing is configured to either route the packet directly to the output FIFO by cut-through routing or route the packet to the RAM for either early forwarding or store and forward routing, wherein the routing means is configured to refrain from requesting the cut-through routing for packets larger than the output FIFO;

wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO;

wherein the output port comprises a means for delaying the forwarding of the stored data to the output FIFO until the RAM has received enough of the packet to ensure that the output port will not underflow.

56. A network switch comprising:

a plurality of ports, wherein a first one of said ports is an input port configured to receive data forming a packet, wherein a second one of said ports is an output port configured to convey the packet out of the switch, wherein the output port comprises an output first-in first-out memory (FIFO);

a random access memory (RAM); and a means for routing the data between the input port, the RAM, and the output port, wherein the means for routing is configured to either route the packet directly to the output FIFO by cut-through routing or route the packet to the RAM for either early forwarding or store and forward routing;

wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO;

wherein the output port comprises control logic and an availability register, wherein the availability register is configured to store a value that the control logic compares with the amount of storage available in the output FIFO to determine if a signal granting cut-through should be transmitted to the input port, wherein the value stored in the availability register is selected to prevent under-run on the output port's output FIFO when packets from a slower speed input port are routed to a faster speed output port.

57. A network switch comprising:

a plurality of ports, wherein a first one of said ports is an input port configured to receive data forming a packet, wherein a second one of said ports is an output port configured to convey the packet out of the switch, wherein the output port comprises an output first-in first-out memory (FIFO);

a random access memory (RAM); and a means for routing the data between the input port, the RAM, and the output port, wherein the means for routing is configured to either route the packet directly to the output FIFO by cut-through routing or route the packet to the RAM for either early forwarding or store and forward routing;

wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO;

wherein the input port is configured to refrain from requesting cut-through routing if the packet is larger than the output port's output FIFO.

58. A network switch comprising:

a plurality of ports, wherein a first one of said ports is an input port configured to receive data forming a packet, wherein a second one of said ports is an output port configured to convey the packet out of the switch, wherein the output port comprises an output first-in first-out memory (FIFO);

a random access memory (RAM);

a means for routing the data between the input port, the RAM, and the output port, wherein the means for routing is configured to either route the packet directly to the output FIFO by cut-through routing or route the packet to the RAM for either early forwarding or store and forward routing; and a management CPU, wherein the input port is configured to refrain from requesting cut-through for packets destined for the management CPU;

wherein the routing means is configured to determine whether the output FIFO has sufficient storage available to store the packet, wherein the routing means is configured to route the data from the input port to the output port in response to detecting that the output FIFO has resources available for the packet, wherein the routing means is configured to store the data to the RAM in response to detecting that the output FIFO does not have room available for the packet, and wherein, in response to detecting that the output FIFO has room available to store the packet after at least a portion of the data has already been stored in the RAM, the routing means is configured to forward the stored data to the output FIFO.

* * * * *